(12) United States Patent
Yoshizumi et al.

(10) Patent No.: US 11,951,769 B2
(45) Date of Patent: Apr. 9, 2024

(54) ELECTRIC POWER CONTROL SYSTEM

(71) Applicant: SEMICONDUCTOR ENERGY LABORATORY CO., LTD., Atsugi (JP)

(72) Inventors: Kensuke Yoshizumi, Kanagawa (JP); Ryota Tajima, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 1094 days.

(21) Appl. No.: 16/071,169

(22) PCT Filed: Jan. 18, 2017

(86) PCT No.: PCT/IB2017/050251
§ 371 (c)(1),
(2) Date: Jul. 19, 2018

(87) PCT Pub. No.: WO2017/130080
PCT Pub. Date: Aug. 3, 2017

(65) Prior Publication Data
US 2021/0188068 A1    Jun. 24, 2021

(30) Foreign Application Priority Data

Jan. 29, 2016    (JP) ................................. 2016-015118

(51) Int. Cl.
*B60K 1/02*        (2006.01)
*B60B 21/12*       (2006.01)
(Continued)

(52) U.S. Cl.
CPC ................ *B60B 21/12* (2013.01); *B60K 1/02* (2013.01); *B60K 1/04* (2013.01); *B60K 6/26* (2013.01);
(Continued)

(58) Field of Classification Search
CPC ... B60L 53/60; H01M 50/249; H01M 50/213; H01M 2010/4271; B60K 1/02; B60K 1/04; H02J 7/0013
(Continued)

(56) References Cited

U.S. PATENT DOCUMENTS 4,237,410 A    12/1980  Erickson et al.
4,310,793 A    1/1982   Sheldrake et al.
(Continued)

FOREIGN PATENT DOCUMENTS

CN    002412838 Y    1/2001
CN    203326688 U    12/2013
(Continued)

OTHER PUBLICATIONS

Chinese Office Action (Application No. 201780008438.6) dated Jun. 29, 2021.
(Continued)

*Primary Examiner* — Rexford N Barnie
*Assistant Examiner* — Swarna N Chowdhuri
(74) *Attorney, Agent, or Firm* — NIXON PEABODY LLP; Jeffrey L. Costellia

(57) ABSTRACT

Space-saving in an automobile or the like provided with a battery is achieved. Design flexibility of an automobile or the like can be improved. An electric power control method or an electric power control system capable of utilizing electric power efficiently is provided. It is an electric power control system of an automobile including a car body, a first battery, a second battery, and a control unit. The control unit obtains states of charge of the first battery and the second battery, determines whether or not a difference between remaining capacities of the first battery and the second battery exceeds a predetermined value, and controls transmission of electric power between the first battery and the (Continued)

second battery, in the case where the difference in the remaining capacities exceeds the predetermined value, to be made such that the remaining capacities are close to each other.

8 Claims, 29 Drawing Sheets

(51) Int. Cl.
| | |
|---|---|
| B60K 1/04 | (2019.01) |
| B60K 6/26 | (2007.10) |
| B60K 6/28 | (2007.10) |
| B60L 50/64 | (2019.01) |
| B60L 53/60 | (2019.01) |
| H01M 10/42 | (2006.01) |
| H01M 50/213 | (2021.01) |
| H01M 50/249 | (2021.01) |
| H02J 7/00 | (2006.01) |

(52) U.S. Cl.
CPC ............... *B60K 6/28* (2013.01); *B60L 50/64* (2019.02); *B60L 53/60* (2019.02); *H01M 10/4257* (2013.01); *H01M 50/213* (2021.01); *H01M 50/249* (2021.01); *H02J 7/0013* (2013.01); *B60K 2001/045* (2013.01); *B60Y 2200/91* (2013.01); *B60Y 2200/92* (2013.01); *H01M 2010/4271* (2013.01); *H01M 2220/20* (2013.01)

(58) Field of Classification Search
USPC ........................................................ 307/10.1
See application file for complete search history.

(56) References Cited

U.S. PATENT DOCUMENTS

| | | | |
|---|---|---|---|
| 4,348,628 | A | 9/1982 | Loucks |
| 4,689,531 | A | 8/1987 | Bacon |
| 6,030,106 | A | 2/2000 | Johnson |
| 6,158,541 | A | 12/2000 | Tabata et al. |
| 6,390,216 | B1 | 5/2002 | Sueshige et al. |
| 6,476,571 | B1 | 11/2002 | Sasaki |
| 6,734,645 | B2 | 5/2004 | Auerbach |
| 7,795,844 | B2 | 9/2010 | Ichikawa et al. |
| 7,851,954 | B2 | 12/2010 | Endo et al. |
| 7,866,425 | B2 | 1/2011 | King et al. |
| 7,934,573 | B2 | 5/2011 | Fassnacht |
| 8,120,291 | B2 | 2/2012 | Clark et al. |
| 8,603,687 | B2 | 12/2013 | Hamada et al. |
| 8,963,501 | B2 | 2/2015 | Shigemizu et al. |
| 9,308,966 | B2 | 4/2016 | Kosuge et al. |
| 9,647,256 | B2 | 5/2017 | Abe et al. |
| 9,821,882 | B2 | 11/2017 | Matsuda |
| 9,840,306 | B2 | 12/2017 | Matsuda |
| 10,023,167 | B2 | 7/2018 | Yasui et al. |
| 10,050,437 | B2 | 8/2018 | Nomoto |
| 10,096,812 | B2 | 10/2018 | Abe et al. |
| 10,259,530 | B2 | 4/2019 | Matsuda |
| 10,637,092 | B2 | 4/2020 | Ogawa et al. |
| 2005/0068161 | A1 | 3/2005 | Ichinose et al. |
| 2006/0214500 | A1 | 9/2006 | Hall et al. |
| 2008/0074273 | A1 | 3/2008 | Endo et al. |
| 2009/0315518 | A1 | 12/2009 | Soma et al. |
| 2010/0156352 | A1 | 6/2010 | Muta et al. |
| 2010/0188048 | A1 | 7/2010 | Nishino et al. |
| 2010/0318252 | A1 | 12/2010 | Izumi |
| 2011/0100735 | A1 | 5/2011 | Flett |
| 2011/0139530 | A1* | 6/2011 | Ananthakrishna ...... B60L 50/53 280/287 |
| 2011/0294009 | A1 | 12/2011 | Kawakami et al. |
| 2012/0055727 | A1 | 3/2012 | Omiya et al. |
| 2012/0080934 | A1* | 4/2012 | Lo ........................... B62M 6/65 301/6.5 |
| 2012/0089299 | A1* | 4/2012 | Breed ..................... B60C 19/00 701/1 |
| 2012/0293124 | A1 | 11/2012 | Hirai et al. |
| 2012/0302397 | A1 | 11/2012 | Habbani |
| 2013/0021000 | A1 | 1/2013 | Kuraishi |
| 2013/0134908 | A1 | 5/2013 | Sugiyama et al. |
| 2014/0152262 | A1 | 6/2014 | Nomoto |
| 2014/0197797 | A1 | 7/2014 | Yamazaki |
| 2014/0197802 | A1 | 7/2014 | Yamazaki |
| 2014/0199580 | A1 | 7/2014 | Yamazaki |
| 2014/0349158 | A1* | 11/2014 | Kanemoto ........ H01M 10/0422 429/94 |
| 2016/0036917 | A1* | 2/2016 | Koravadi ................ B60L 53/12 701/2 |
| 2016/0082772 | A1* | 3/2016 | Biderman ................ B60K 7/00 301/6.5 |
| 2017/0008385 | A1* | 1/2017 | Fujimoto ................. H02K 7/14 |
| 2017/0232854 | A1 | 8/2017 | Yamazaki |
| 2019/0319145 | A1 | 10/2019 | Cheng et al. |

FOREIGN PATENT DOCUMENTS

| | | |
|---|---|---|
| CN | 104210609 A | 12/2014 |
| CN | 104661854 A | 5/2015 |
| CN | 105027344 A | 11/2015 |
| CN | 105059463 A | 11/2015 |
| CN | 204821898 U | 12/2015 |
| CN | 211828948 U | 10/2020 |
| EP | 2357714 A | 8/2011 |
| EP | 2688179 A | 1/2014 |
| EP | 2905161 A | 8/2015 |
| EP | 2905166 A | 8/2015 |
| EP | 2905167 A | 8/2015 |
| EP | 2905168 A | 8/2015 |
| EP | 3037312 A | 6/2016 |
| EP | 3059793 A | 8/2016 |
| EP | 3196969 A | 7/2017 |
| EP | 3462530 A | 4/2019 |
| EP | 3553831 A | 10/2019 |
| FR | 2733187 | 10/1996 |
| JP | 49-012339 A | 2/1974 |
| JP | 03-056040 A | 3/1991 |
| JP | 05-152002 A | 6/1993 |
| JP | 08-310254 A | 11/1996 |
| JP | 2003-002018 A | 1/2003 |
| JP | 2003-127624 A | 5/2003 |
| JP | 2003-151064 A | 5/2003 |
| JP | 2004-236381 A | 8/2004 |
| JP | 2006-121874 A | 5/2006 |
| JP | 2009-181907 A | 8/2009 |
| JP | 2009-189120 A | 8/2009 |
| JP | 2009-199034 A | 9/2009 |
| JP | 2009-261201 A | 11/2009 |
| JP | 4400414 | 1/2010 |
| JP | 2010036823 A * | 2/2010 |
| JP | 2010-060406 A | 3/2010 |
| JP | 2010-141970 A | 6/2010 |
| JP | 2011-076927 A | 4/2011 |
| JP | 2011-151943 A | 8/2011 |
| JP | 2011-216200 A | 10/2011 |
| JP | 2012-009418 A | 1/2012 |
| JP | 2013-209001 A | 10/2013 |
| JP | 2013-002120 | 2/2015 |
| JP | 2015-040029 A | 3/2015 |
| JP | 2016-083985 A | 5/2016 |
| JP | 2016083985 A * | 5/2016 |
| JP | 2018-131035 A | 8/2018 |
| JP | 2019-186511 A | 10/2019 |
| WO | WO-2013/088554 | 6/2013 |
| WO | WO-2016/043319 | 3/2016 |

OTHER PUBLICATIONS

Invitation To Pay Additional Fees (Application No. PCT/IB2017/050251), International Searching Authority, dated Mar. 14, 2017.

(56) References Cited

OTHER PUBLICATIONS

International Search Report (Application No. PCT/IB2017/050251) dated Apr. 18, 2017.
Written Opinion (Application No. PCT/IB2017/050251) dated Apr. 18, 2017.

* cited by examiner

FIG. 20A1
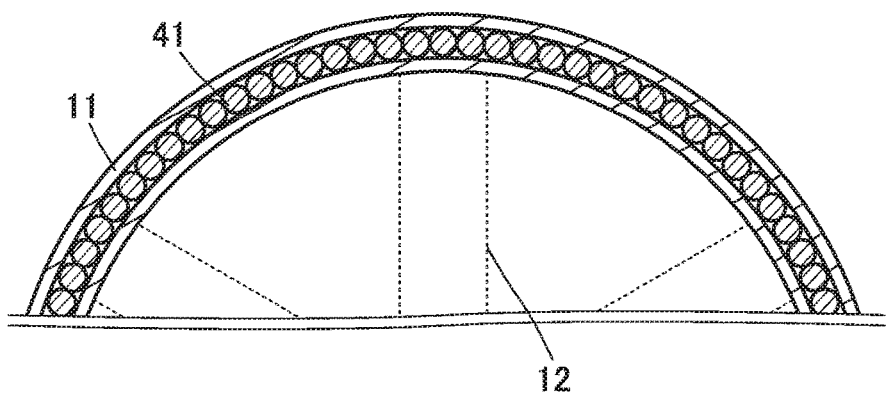
FIG. 20A2
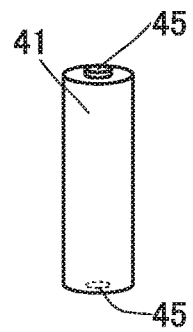
FIG. 20B1
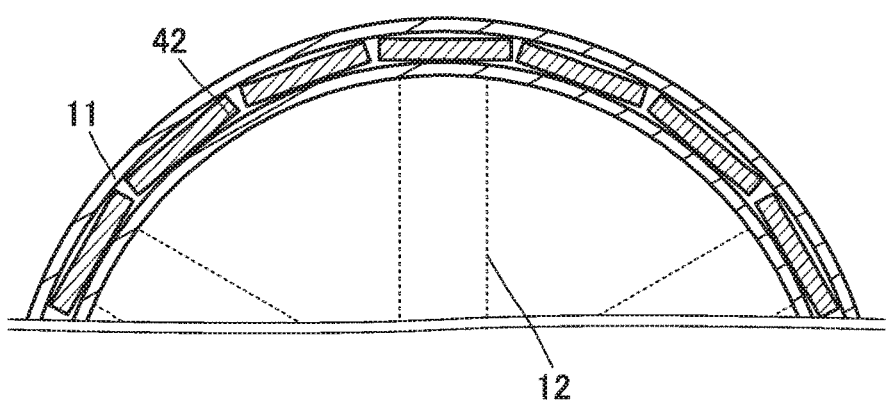
FIG. 20B2
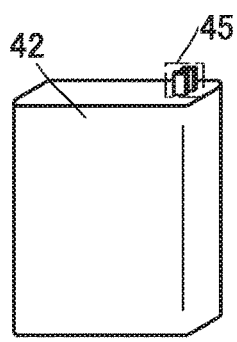
FIG. 20C1
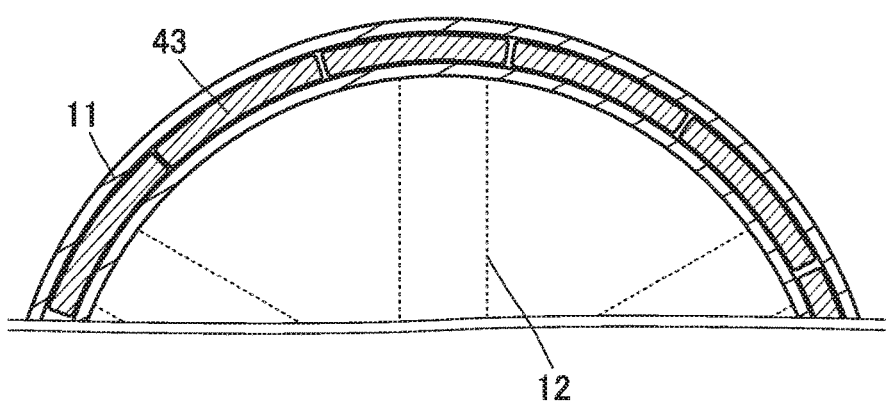
FIG. 20C2
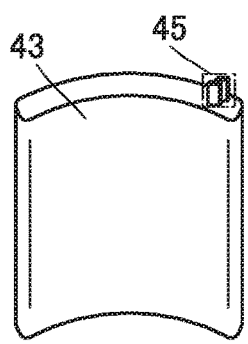

ELECTRIC POWER CONTROL SYSTEM

TECHNICAL FIELD

One embodiment of the present invention relates to a vehicle. One embodiment of the present invention relates to an automobile. One embodiment of the present invention relates to an electric power control system, an electric power control method, and a program for a vehicle, an automobile, or the like.

One embodiment of the present invention relates to a wheel. One embodiment of the present invention relates to a power storage device. One embodiment of the present invention relates to a secondary battery.

Note that one embodiment of the present invention is not limited to the above technical fields. As the technical field of one embodiment of the present invention disclosed in this specification, a semiconductor device, a display device, a light-emitting device, a power storage device, a memory device, an electronic device, a lighting device, an input device, an input/output device, a driving method thereof, or a manufacturing method thereof can be given as an example, in addition to a vehicle including an automobile.

BACKGROUND ART

In recent years, a technique for utilizing electric power of a battery as power of an automobile has been attracting attention. As such an automobile, a hybrid electric vehicle (HEV), an electric vehicle (EV), a plug-in hybrid electric vehicle (PHEV), or the like is given, for example.

In addition, for a battery to be provided in an automobile, development of a lithium-ion battery has been carried out. An example of a lithium-ion battery includes at least a positive electrode, a negative electrode, and an electrolytic solution (Patent Document 1).

PRIOR ART DOCUMENT

Patent Document

[Patent Document 1] Japanese Published Patent Application No. 2012-9418

SUMMARY OF THE INVENTION

Problems to be Solved by the Invention

In an automobile provided with a battery used for power, the battery is required to have a very large capacity in order to increase the mileage. However, there has been a limit to the capacity of a battery that can be provided in an automobile, because of a problem such as the volume of the battery. In particular, it has been difficult to provide a battery having a sufficient capacity in a small automobile, because of a problem of the living space being narrowed.

An object of one embodiment of the present invention is to achieve space-saving of a vehicle such as an automobile provided with a battery. Another object is to increase the design flexibility of a vehicle such as an automobile.

Another object of one embodiment of the present invention is to provide an electric power control method or an electric power control system with which electric power can be efficiently utilized in a vehicle such as an automobile provided with a battery.

Another object is to provide a novel electric power control method or electric power control system. Another object is to provide a novel vehicle, a novel wheel for a vehicle, a novel automobile, or a novel wheel for an automobile. Another object is to provide a novel electric power feeding system that can be used for an automobile.

Note that the description of these objects does not preclude the existence of other objects. In one embodiment of the present invention, there is not necessarily a need to achieve all the objects. Other objects can be derived from the descriptions of the specification, the drawings, the claims, and the like.

Means for Solving the Problems

One embodiment of the present invention is an electric power control system of a vehicle including a car body, a first battery, a second battery, and a control unit. The control unit has a function of obtaining states of charge of the first battery and the second battery. The control unit has a function of determining whether or not a difference between remaining capacities of the first battery and the second battery exceeds a predetermined value, and controlling transmission of electric power between the first battery and the second battery, in a case where the difference in the remaining capacities exceeds the predetermined value, to be made such that the remaining capacities are close to each other.

Furthermore, the above control unit preferably has a function of controlling transmission of electric power between the first battery and the second battery to be made, in a case where the car body is in a resting state or an idle running state.

Furthermore, in the above, an electric power control unit, a braking control unit, and a motor are preferably included. The braking control unit has a function of controlling the motor such that the motor generates electric power at the time of braking. The motor has a function of transmitting generated electric power to the electric power control unit. The control unit has a function of controlling the electric power control unit so as to supply electric power preferentially to either the first battery or the second battery.

Furthermore, in the above, an electric power control unit, a braking control unit, and a motor are preferably included. The braking control unit has a function of controlling the motor such that the motor generates electric power at the time of braking. The motor has a function of transmitting generated electric power to the electric power control unit. The control unit has a function of obtaining states of charge of the first battery and the second battery, and controlling the electric power control unit so as to supply the electric power to either the first battery or the second battery that has a smaller remaining capacity.

Another embodiment of the present invention is an electric power control system of an automobile including a car body, a wheel, a first battery, a second battery, and a control unit. Here, the first battery is provided in the wheel. The second battery is provided in the car body. The control unit has a function of obtaining states of charge of the first battery and the second battery. The control unit has a function of determining whether or not a difference between remaining capacities of the first battery and the second battery exceeds a predetermined value, and controlling transmission of electric power between the first battery and the second battery, in a case where the difference in the remaining capacities exceeds the predetermined value, to be made such that the remaining capacities are close to each other.

Furthermore, the control unit preferably has a function of controlling transmission of electric power between the first battery and the second battery to be made, in a case where the car body is in a resting state or an idle running state.

Furthermore, in the above, an electric power control unit, a braking control unit, and a motor are preferably included. The braking control unit has a function of controlling the motor such that the motor generates electric power at the time of braking. The motor has a function of transmitting generated electric power to the electric power control unit. The control unit has a function of controlling the electric power control unit so as to supply electric power preferentially to the first battery.

Furthermore, in the above, a first electric power control unit and a second electric power control unit, instead of the electric power control unit, are preferably included. The first electric power control unit has a function of controlling charge and discharge of the first battery. The second electric power control unit has a function of controlling charge and discharge of the second battery. Here, the first electric power control unit and the second electric power control unit are preferably connected so as to transmit electric power to each other.

Furthermore, in the above, the motor is preferably provided in the wheel.

Furthermore, the wheel or the automobile that can be used for the above electric power control system can use a structure described below, for example.

One embodiment of the present invention is a wheel including a rim portion, a disk portion, a battery, and a first electric power transmission mechanism. The battery is provided inside the rim portion or along a surface of the rim portion. The first electric power transmission mechanism is provided in the disk portion and is electrically connected to the battery.

Furthermore, in the above, the battery preferably is a secondary battery sealed with a film, has a belt-like shape, and is provided in a state of being wrapped around a cylindrical portion of the rim portion. In that case, the battery is preferably provided in a state of being wrapped around the cylindrical portion of the rim portion more than one lap.

In the above, a structure including a plurality of batteries, each of which has a cylindrical shape or a columnar shape, may also be employed.

Furthermore, in the above, the first electric power transmission mechanism preferably is a connector including a contact point. Alternatively, the first electric power transmission mechanism preferably has a function of wirelessly transmitting and receiving electric power.

Another embodiment of the present invention is a vehicle to which the above wheel can be attached, including an electric power control unit and a second electric power transmission mechanism. The second electric power transmission mechanism has a function of being electrically connected to the first electric power transmission mechanism. The electric power control unit preferably has a function of controlling charge and discharge of the battery through the second electric power transmission mechanism and the first electric power transmission mechanism.

Furthermore, in the above, the second electric power transmission mechanism preferably is a connector having a function of maintaining electrical connection with the first electric power transmission mechanism even when rotating. Alternatively, the second electric power transmission mechanism preferably has a function of wirelessly transmitting and receiving electric power.

Effects of the Invention

According to one embodiment of the present invention, space-saving of a vehicle such as an automobile provided with a battery can be achieved; the design flexibility of a vehicle such as an automobile can be increased; an electric power control method or an electric power control system with which electric power can be efficiently utilized in a vehicle such as an automobile provided with a battery can be provided; a novel electric power control method or a novel electric power control system can be provided; a novel vehicle, a novel wheel for a vehicle, a novel automobile, or a novel wheel for an automobile can be provided; or a novel electric power feeding system that can be used for a vehicle such as an automobile can be provided.

Note that the description of these effects does not preclude the existence of other effects. One embodiment of the present invention does not necessarily achieve all the effects listed above. Other effects will be derived from the description of the specification, the drawings, the claims, and the like.

BRIEF DESCRIPTION OF THE DRAWINGS

FIG. 20 Drawings each illustrating a wheel of an embodiment.

EMBODIMENTS FOR CARRYING OUT THE INVENTION

Figure 1:
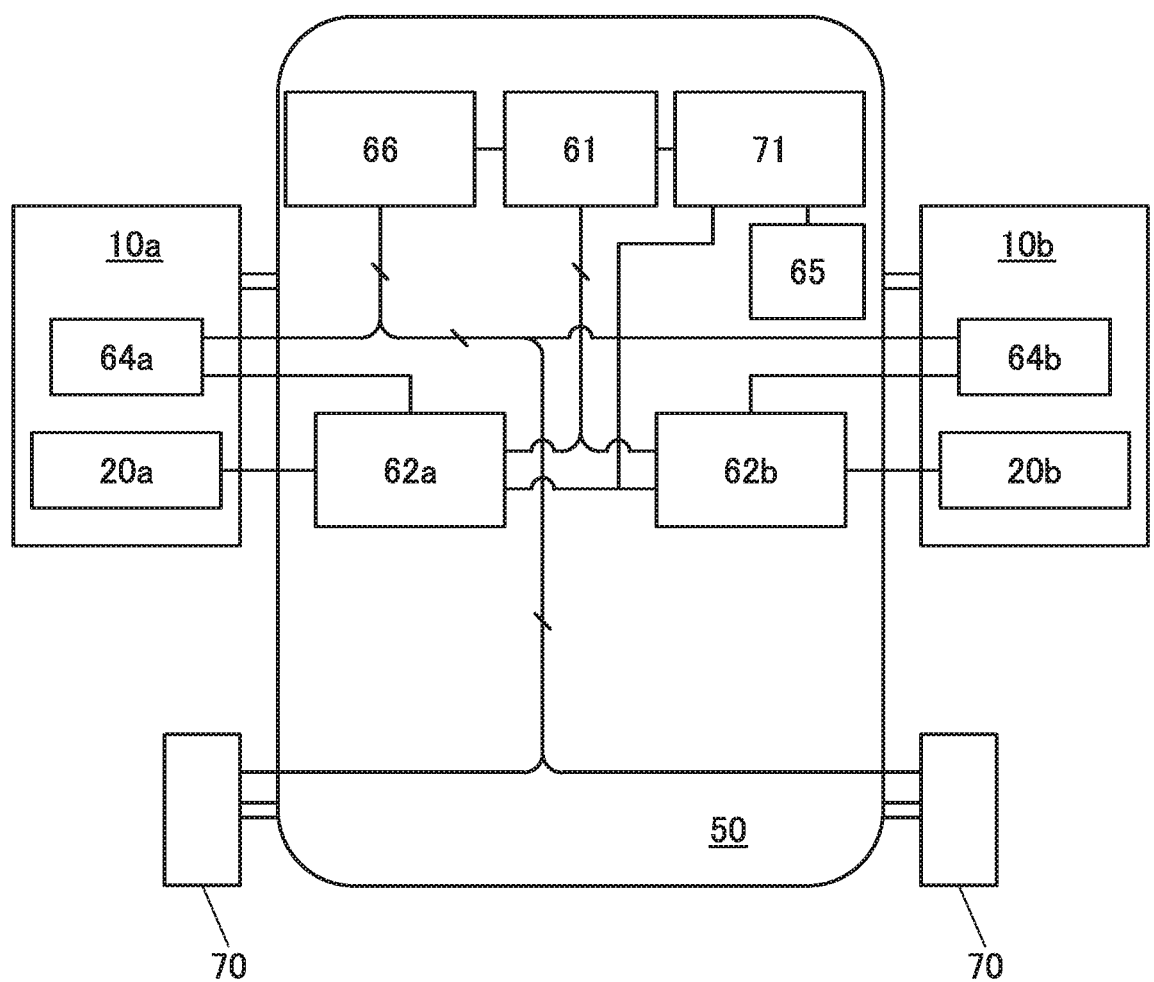
FIG. 1 A drawing illustrating an electric power control system of an embodiment.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments.

Note that in structures of the present invention described below, the same portions or portions having similar functions are denoted by the same reference numerals in different drawings, and a description thereof is not repeated. Furthermore, the same hatching pattern is applied to portions having similar functions, and the portions are not especially denoted by reference numerals in some cases.

Note that in each drawing described in this specification, the size, the layer thickness, or the region of each component is exaggerated for clarity in some cases. Therefore, the size, the layer thickness, or the region is not limited to the illustrated scale.

Note that in this specification and the like, ordinal numbers such as "first," "second," and the like are used in order to avoid confusion among components and do not limit the number.

Embodiment 1

In this embodiment, an electric power control method and an electric power control system of one embodiment of the present invention will be described. Furthermore, in this embodiment, a structure example of an automobile or the like which is an embodiment of a vehicle to which the electric power control method of one embodiment of the present invention can be applied will be described.

The electric power control system of one embodiment of the present invention is related to a vehicle having a car body and a wheel (an automobile, for example). The car body is provided with at least a control unit. The control unit can have a structure including an arithmetic device (computer), a memory device, and the like, for example.

Furthermore, the electric power control system of one embodiment of the present invention includes at least two or more batteries. The plurality of batteries can be provided in the car body or the wheel. It is particularly preferable that the battery be provided in each of the car body and the wheel.

Furthermore, the electric power control system of one embodiment of the present invention preferably has a structure where electric power can be transmitted between the plurality of batteries.

Furthermore, the electric power control system of one embodiment of the present invention preferably includes a motor as power. In addition, the electric power control system of one embodiment of the present invention preferably has a structure where regenerative electric power is generated by the motor and the electric power is supplied to the plurality of batteries so that the batteries can be charged.

The electric power control system of one embodiment of the present invention enables the regenerative electric power from the motor to be supplied preferentially to a predetermined battery, or to be supplied selectively to a battery with the smallest charge remaining (also referred to as remaining capacity) among the plurality of batteries, for example.

Furthermore, the system of one embodiment of the present invention is capable of transmission of electric power between batteries in such a manner that a difference in charge remaining between the batteries is decreased, in the case where there is such a difference. This operation is preferably carried out when the vehicle is in a resting state or in an idle running state. In other words, it is preferable that transmission of electric power between the batteries be carried out in a period during which the motor is not generating power, i.e., in a period during which electric power of the battery is not being supplied to the motor.

The use of the system capable of such an operation can prevent a situation in which one or more batteries are in a fully charged state or a completely discharged state (including a state with the smallest amount of charge in the usage range of the battery) among the plurality of batteries. It is known that the deterioration of a secondary battery, which can be used as a battery, is accelerated when a fully charged state or a state with an extremely small amount of charge continues. Accordingly, the system of one embodiment of the present invention can suppress the deterioration of a battery, and can provide a vehicle such as an automobile with less-frequent maintenance such as battery replacement or free from such maintenance.

Note that, in one embodiment of the present invention, as a form of a program that makes a control unit or a computer in the control unit execute such an operation, the program can be stored in the control unit or a memory device which is provided separately from the control unit. The control unit is capable of reading out the program from the memory device and executing the program.

An electric power transmission system of one embodiment of the present invention can be applied to a vehicle such as an automobile. An automobile is an embodiment of a vehicle. As an automobile, a specialized vehicle such as a civil engineering work vehicle and a crane truck is included, in addition to a car, a truck, and a bus. In addition, the electric power transmission system of one embodiment of the present invention can be installed in a one-wheeled, two-wheeled, or three-wheeled vehicle or a vehicle with five or more tires, in addition to a four-wheeled vehicle. As a two-wheeled vehicle, a structure with two wheels attached to a car body, one behind the other, like a motorcycle may be employed, or a structure with two tires provided on sides of a car body face-to-face may be employed. The system can also be applied to a bicycle, an electric bicycle, a power-assisted bicycle, a tire for an airplane, a tire for a helicopter, a tire for a vertical take-off and landing aircraft, an amphibious car, a tank, or the like.

In addition, the electric power transmission system of one embodiment of the present invention can be applied to a vehicle that does not use a tire. For example, it can be used for a wheel of a car that moves on a rail as a guideway. For example, it can be used for a vehicle such as a railroad (including an electric train, a steam train, a steam locomotive, and the like), a streetcar, a cable car, and the like.

Furthermore, one embodiment of the present invention can be applied to a toy that copies the above-mentioned vehicle.

Hereinafter, more detailed examples of the electric power control system, the electric power control method, or the program will be described with reference to drawings.

[Structure Example of System]

FIG. 1 shows a block diagram of a system 80 of one embodiment of the present invention.

The system 80 includes a car body 50, a wheel 10a, a wheel 10b, wheels 70, and the like. The car body 50 includes a control unit 61, an electric power control unit 62a, an electric power control unit 62b, an electric power control unit 71, a braking control unit 66, a battery 65, and the like. The wheel 10a includes a motor 64a and a battery 20a. The wheel 10b includes a motor 64b and a battery 20b. The wheels 70 function as follower wheels.

Here, an example where an automobile to which the system 80 is applied is an electric vehicle or electrical vehicle (EV), which uses electricity as power, is shown.

The control unit 61 has a function of performing varied electronic control in addition to power control and electric power control. Specifically, the control unit 61 can perform control of the electric power control unit 62a, the electric power control unit 62b, and the electric power control unit 71, control of the braking control unit 66, and the like. As the control unit 61, an ECU (electric control unit, or also referred to as engine control unit) can typically be used. Furthermore, in accordance with the driving method of the automobile, an ECU with a function that is unique to an EV, an HEV (hybrid electro vehicle), or a PHEV (plug-in hybrid vehicle) is preferably used.

The motor 64a and the motor 64b are devices that produce power for rotating the wheel 10a or the wheel 10b. The motor 64a can produce power in accordance with electric power supplied from the electric power control unit 62a. Similarly, the motor 64b can produce power in accordance with electric power supplied from the electric power control unit 62b.

The motor 64a and the motor 64b have a function of generating electric power from the rotational energy of the wheel 10a or the wheel 10b at the time of braking, and supplying the electric power to the electric power control unit 62a or the electric power control unit 62b. The function like this can be referred to as an electric power regeneration function. The electric power regeneration operations of the motor 64a and the motor 64b are controlled by the control unit 61 and the braking control unit 66.

The electric power control unit 62a, the electric power control unit 62b, and the electric power control unit 71 are each controlled by the control unit 61. The electric power control unit 62a, the electric power control unit 62b, and the electric power control unit 71 have a function of controlling charge and discharge of the battery 20a, the battery 20b, and the battery 65, respectively. Specifically, they each have a function of outputting electric power from the battery 20a, the battery 20b, or the battery 65, and a function of supplying electric power to the battery 20a, the battery 20b, or the battery 65. Furthermore, the electric power control unit 62a, the electric power control unit 62b, and the electric power control unit 71 preferably have a function of adjusting voltage (transforming voltage).

The electric power control unit 62a and the electric power control unit 62b may each have a structure including a step-up circuit (converter), a conversion circuit (inverter), and a computer that controls these, for example. The converter is a circuit that raises the voltage of electric power supplied from the battery 20a and the battery 20b to the voltage for driving the motor 64a, the motor 64b, or the like. The inverter is a circuit that converts a direct current voltage to an alternating current voltage for driving the motor 64a, the motor 64b, or the like. Furthermore, for an electric power regeneration function, a conversion circuit that converts an alternating current voltage output from the motor 64a or the motor 64b to a direct current voltage, a step-down circuit that lowers it to a voltage for charging the battery 20a and the battery 20b, and the like are preferably included.

The electric power control unit 71 can have a structure including a step-up circuit, a step-down circuit, an inverter, a converter, or the like, and a computer that controls these, similarly to the electric power control unit 62a and the like. Since the electric power control unit 71 does not directly supply electric power to the motor 64a and the motor 64b here, it may include a function of converting the voltage of electric power supplied from the battery 65 to the voltage output to the electric power control unit 62a, the electric power control unit 62b, or another component.

Here, the electric power control unit 62a, the electric power control unit 62b, and the electric power control unit 71 are configured to be connected by an electric power transmission path to enable electric power transmission therebetween. In this way, the battery 65, the battery 20a, and the battery 20b can transmit/receive the charged electric power to/from each other.

The braking control unit 66 has a function of controlling braking. As a braking means, a physical brake utilizing oil pressure such as a disk brake and a drum brake (hereinafter also referred to as a physical brake), an electric brake using a load required to rotate a motor (hereinafter also referred to as an electric brake or a regenerative brake), and the like are given. En order to add the electric power regeneration function, a structure where an electric brake is used and electromotive force (also referred to as regenerative electric power) generated by rotation of a motor is utilized can be employed. Here, it is preferable that a braking system in which both of a physical brake and an electric brake are combined be used for the braking control unit 66.

Here, the braking control unit 66 has a function of braking the wheel 10a and the wheel 10b, with a combination of a physical brake utilizing oil pressure or the like and an electric brake. In addition, it has a function of braking the wheel 70 with a physical brake.

The control unit 61 calculates how much braking torque is required for each wheel, in accordance with the brake operation input by a driver and the conditions of the car body (speed, moving direction, attitude of the car body, and the like). In the case where a physical brake and an electric brake are used in combination, the control unit 61 calculates how to allocate the torque to be generated by each of the two brakes. Then, the control unit 61 controls the braking control unit 66 in accordance with the result, whereby a smooth braking operation can be performed.

Here, an example where the automobile to which the system 80 is applied has a structure where the motor is provided in the wheel is described. Such a structure can be referred to as an in-wheel motor.

A motor, a battery, and an electric power control unit that are involved in driving of one wheel can be regarded as one unit. Taking the wheel 10a as an example, the motor 64a, the battery 20a, and the electric power control unit 62a correspond to one unit. At this time, electric power for driving the motor 64a is supplied to the battery 20a through the electric power control unit 62a. Furthermore, regenerative electric power generated by the motor 64a is supplied to the battery 20a through the electric power control unit 62a. In this manner, when a unit including the motor, the battery, and the electric power control unit is provided for each wheel, the efficiency of electric power transmission is improved and an electric power loss can be reduced.

Note that, although an example where the wheel 10a includes the motor 64a and the battery 20a is described here, one embodiment is not limited to this; either one or both of the motor 64a and the battery 20a may be provided in the car body 50, or the electric power control unit 62a may be provided in the wheel 10a.

[Example of Operation Method]

An example of an operation method of the electric power control system of one embodiment of the present invention will be described below.

[Main Flow]

Figure 2:
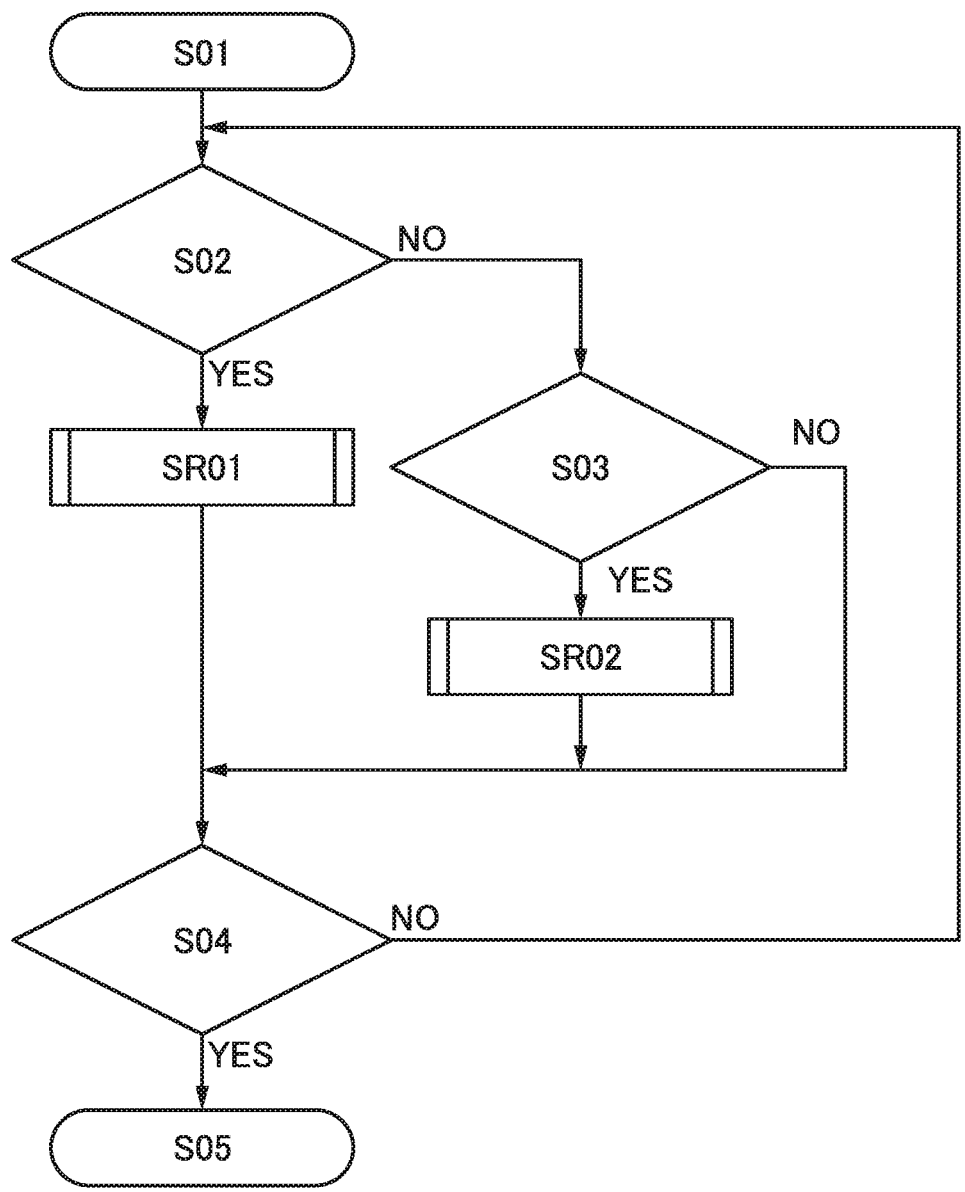
FIG. 2 A flow chart related to an operation method of an electric power control system of an embodiment.

In FIG. 2, a flow chart related to an operation method of the electric power control system is shown. The following operation (control) is mainly performed by the control unit 61.

First, in Step S01, the system starts. It corresponds to a condition where an automobile was started up or a condition where a user set and activated the system, for example.

Subsequently, in Step S02, whether or not regenerative electric power is supplied is determined. For example, whether or not a brake operation is performed and an electric brake is used is determined. In the case where regenerative electric power is supplied, the operation proceeds to Process SR01; and in the case where regenerative electric power is not supplied, the operation proceeds to Step S03.

In Step S03, whether or not the automobile is in a resting state or an idle running state is determined. In the case where the state of the automobile is in the resting state or the idle running state, the operation proceeds to Process SR02; and if not, the operation proceeds to Step S04.

Here, the resting state is a state where the automobile is stationary with respect to the ground, for example, and the motor 64a and the like are not producing power. The idle running state is a state where the automobile is moving with respect to the ground, for example, the motor 64a is not producing power, and the braking operation is not performed. In other words, in the idle running state, the automobile is moving with inertial force.

The resting state and the idle running state can be expressed as a state where electric power required for power is not consumed and a state where electric power is not generated by electric power regeneration.

Here, after Process SR01 is completed and after. Process SR02 is completed, the operation proceeds to Step S04.

In Step S04, whether or not to terminate the system is determined. In the case where the system is to be terminated, the operation proceeds to Step S05 to terminate the system. If not, the operation proceeds again to Step S02.

The above is the description of the main flow.

[Electric Power Regeneration Operation 1]

Figure 3:
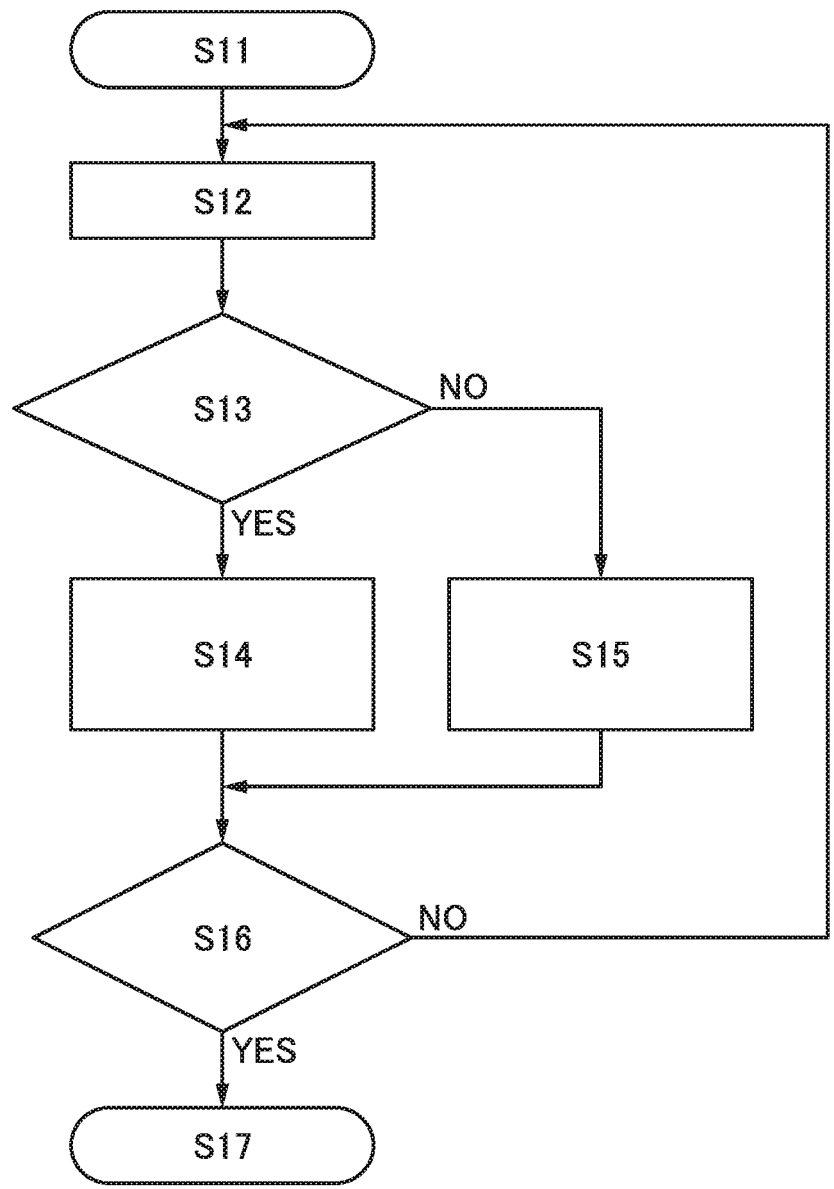
FIG. 3 A flow chart related to an operation method of an electric power control system of an embodiment.

In FIG. 3, a flow chart related to Process SR01 is shown. Process SR01 is a process related to an electric power regeneration operation. The following operation (control) is mainly performed by the control unit 61.

First, in Step S11, the electric power regeneration operation starts.

In Step S12, the remaining of each battery is checked.

In the example shown in FIG. 1, the state of charge of each of the battery 20a, the battery 20b, and the battery 65 is checked.

In Step S13, whether or not regenerative electric power can be supplied to a predetermined battery is determined. In other words, whether or not the predetermined battery among the batteries can be charged is determined. In the case where regenerative electric power can be supplied to the predetermined battery, the operation proceeds to Step S14. If not, the operation proceeds to Step S15.

In Step S14, regenerative electric power is supplied to the predetermined battery, and the operation proceeds to Step S16.

In Step S15, regenerative electric power is supplied to the other batteries except the predetermined battery, and the operation proceeds to Step S16.

Subsequently, in Step S16, whether or not supply of regenerative electric power is completed is determined. In the case where the supply of regenerative electric power is continuing, the operation returns to Step S12. On the other hand, in the case where the supply of regenerative electric power is completed, the operation proceeds to Step S17.

In Step S17, the electric power regeneration operation is completed.

The above is the description of the flow shown in FIG. 3.

Figure 4A:
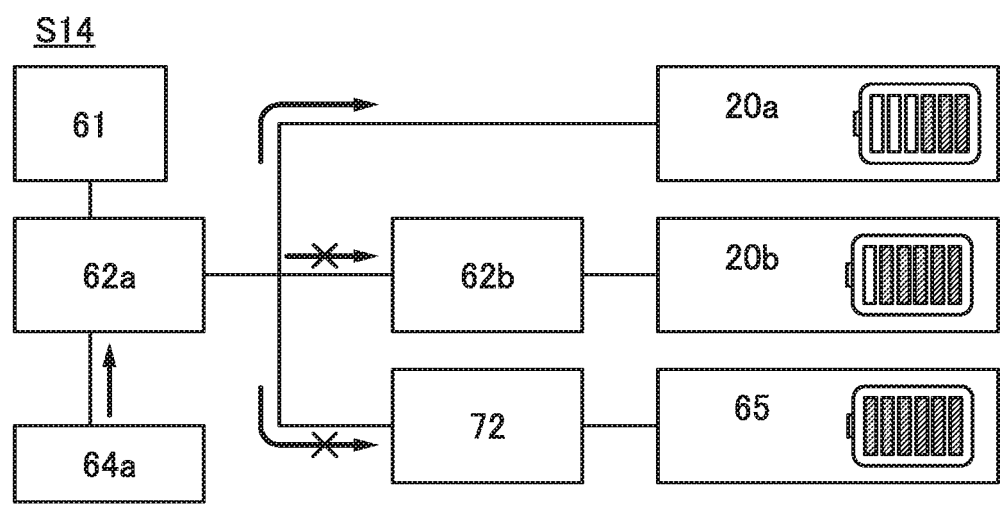
FIG. 4 Drawings illustrating an operation method of an electric power control system of an embodiment.

Here, the electric power regeneration operation illustrated in FIG. 3 will be described with reference to FIGS. 4(A) and (B). FIGS. 4(A) and (B) are schematic views selectively showing the control unit 61, the electric power control unit 62a, the electric power control unit 62b, the electric power control unit 72, the motor 64a, the battery 20a, the battery 20b, and the battery 65, from the components of the system 80 shown in FIG. 1. Here, the direction in which electric power is supplied is indicated by arrows. Furthermore, the state of charge of each of the batteries is schematically shown; the larger the hatched area is, the larger the amount of charge is.

In FIGS. 4(A) and (B), an example of a case where regenerative electric power is generated in the motor 64a is shown. Thus, the electric power generated in the motor 64a is first sent to the electric power control unit 62a.

FIG. 4(A) shows a schematic view related to the operation in Step S14. That is, it is an example of a case where the battery 20a is not fully charged and can be additionally charged. At this time, as shown in FIG. 4(A), the control unit 61 controls the supply of electric power so that the electric power is supplied from the electric power control unit 62a to the battery 20a.

Figure 4B:
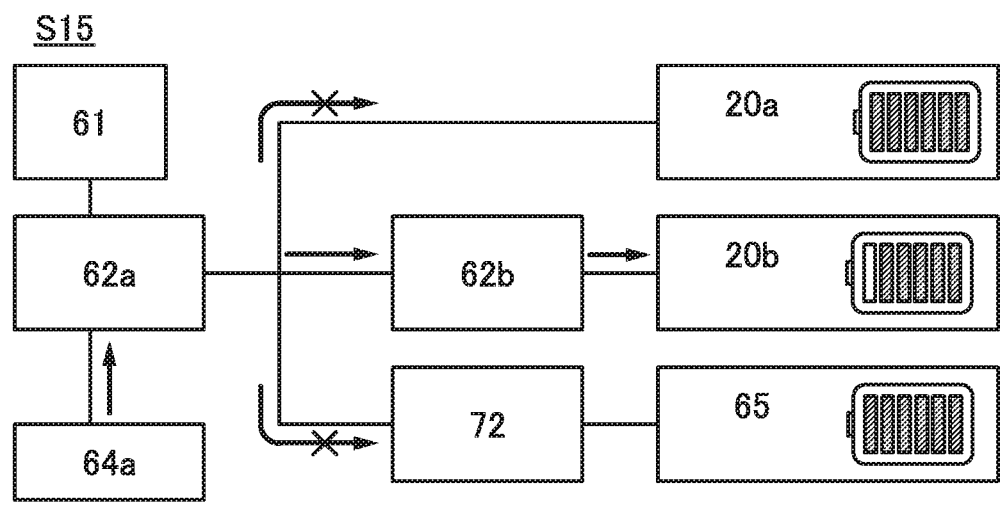

In contrast, FIG. 4(B) shows a schematic view related to the operation in Step S15. That is, it is a state where the battery 20a is fully charged and electric power cannot be supplied thereto any further. At this time, regenerative electric power is supplied from the electric power control unit 62a through the electric power control unit 62b to the battery 20b, or through the electric power control unit 72 to the battery 65. In FIG. 4(B), an example of a case where regenerative electric power is not supplied to the battery 65 since the battery 65 is fully charged, and regenerative electric power is supplied only to the battery 20b is shown.

As described above, the electric power regeneration operation of one embodiment of the present invention is capable of supplying regenerative electric power preferentially to a battery that constitutes a unit with a motor where regenerative electric power is generated. In this way, an electric power transmission loss can be reduced.

[Electric Power Regeneration Operation 2]

Figure 5:
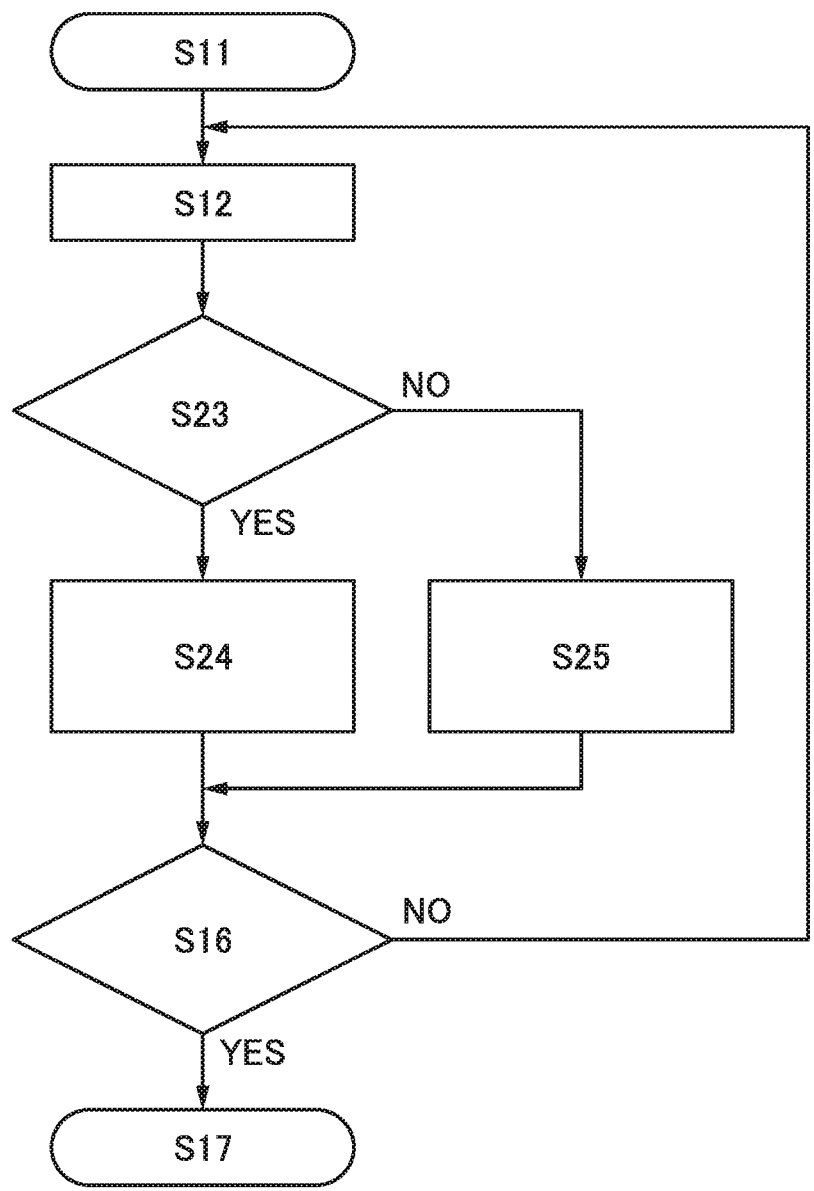
FIG. 5 A flow chart related to an operation method of an electric power control system of an embodiment.

An example that is partially different from the above electric power regeneration operation 1 will be described below. FIG. 5 is a flow chart related to the electric power regeneration operation. FIG. 5 is different from FIG. 3 in that Step S23, Step S24, and Step S25 are included instead of Step S13, Step S14, and Step S15.

In Step S23, the states of charge of the batteries are compared, and whether or not a difference in remaining between the batteries is larger than or equal to a predetermined value is determined. Then, the operation proceeds to Step S24 in the case where there is a difference larger than or equal to the predetermined value, and to Step S25 if not.

In Step S24, regenerative electric power is supplied to the battery with the smallest remaining among the batteries, and the operation proceeds to Step S16.

In Step S25, regenerative electric power is supplied to the predetermined battery, and the program proceeds to Step S16.

The above is the description of the flow shown in FIG. 5.

Figure 6:
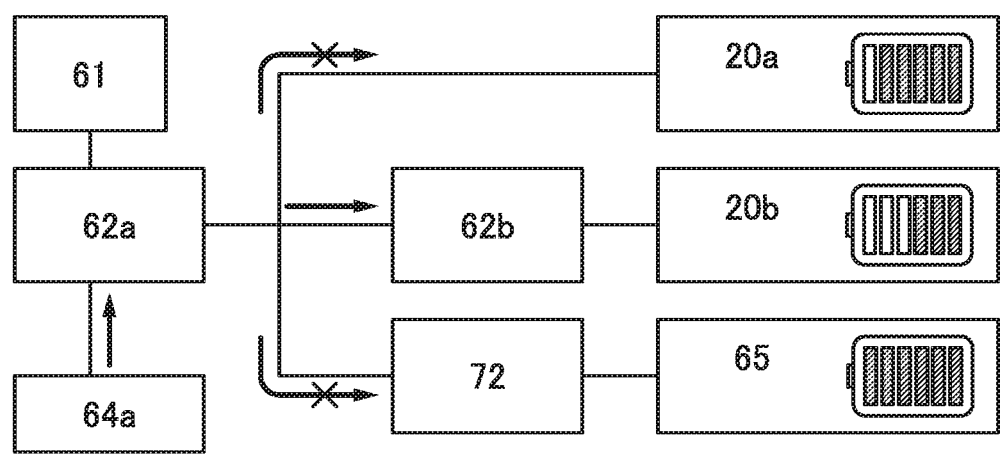
FIG. 6 A drawing illustrating an operation method of an electric power control system of an embodiment.

FIG. 6 is a schematic view illustrating the operation of Step S24. In FIG. 6, supply of regenerative electric power is controlled such that regenerative electric power generated in the motor 64a is supplied to the battery 20b of which the amount of charge is the smallest among the battery 20a, the battery 20b, and the battery 65.

As described above, in one embodiment of the present invention, the battery to be supplied with regenerative electric power can be switched and used in accordance with the states of charge of the batteries. In this manner, it is possible to prevent a condition where one or more of the plurality of batteries are running out of the amount of charge.

Here, the value to be used for determination of a difference in amount of charge of the batteries is appropriately set in accordance with a case where the capacities of the batteries are the same or a case where they are different. As an example, when a fully charged state is 100% and a discharge state is 0% in the range specified by a rated voltage range of the battery or the like, in the case where there is a difference of 10% or more, preferably 5% or more, and more preferably 2% or more between two batteries, the two batteries can be determined to have a difference larger than or equal to a predetermined value in amount of charge. Furthermore, the amount of charge may also be defined by a voltage value, a current amount, an electric power amount, or the like other than the above.

The above is the description of the electric power regeneration operation.

[Electric Power Smoothing Operation]

Figure 7:
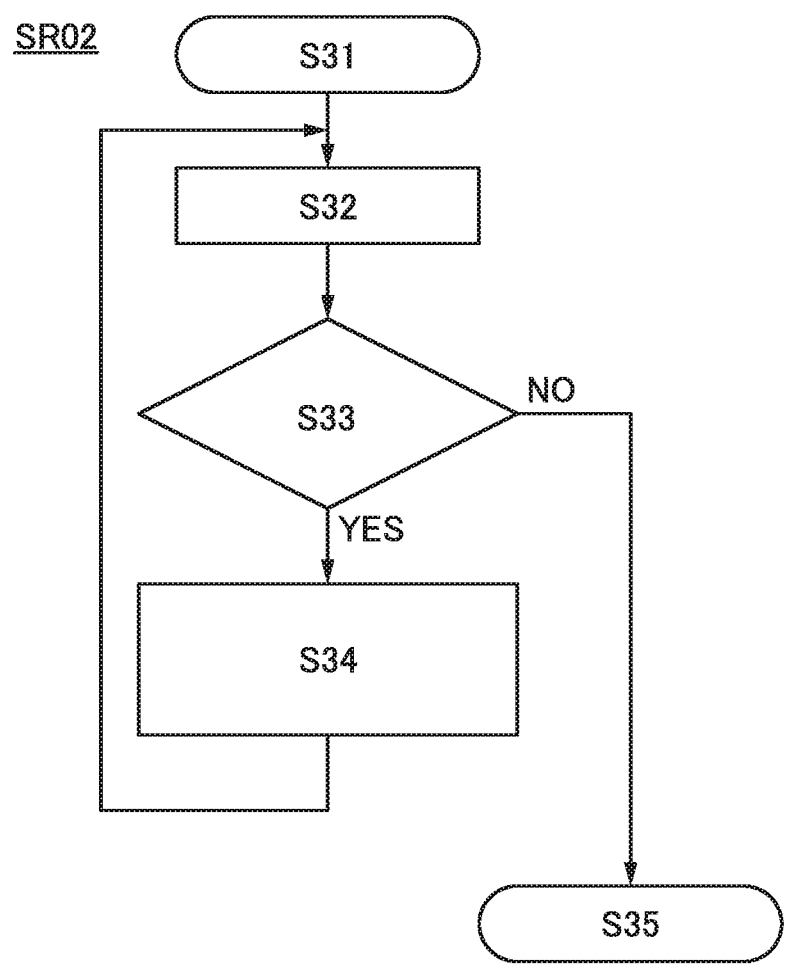
FIG. 7 A flow chart related to an operation method of an electric power control system of an embodiment.

In FIG. 7, a flow chart related to Process SR02 is shown; Process SR02 is a process related to an electric power smoothing operation. Here, the electric power smoothing operation is an operation for decreasing or eliminating a difference in amount of charge of the batteries. The following operation (control) is mainly performed by the control unit 61.

First, in Step S31, the electric power smoothing operation starts.

In Step S32, the remaining of each battery is checked.

In Step S33, the states of charge of the batteries are compared, and whether or not a difference in remaining between the batteries is larger than or equal to a predetermined value is determined. Then, the operation proceeds to Step S34 in the case where there is a difference larger than or equal to the predetermined value, and to Step S35 if not.

In Step S34, electric power is supplied from the battery with a large amount of remaining to the battery with a small amount of remaining among the batteries. After that, the operation returns to Step S32.

The above is the description of the flow shown in FIG. 7. In the flow shown in FIG. 7, the electric power smoothing operation is completed when a difference in remaining of the batteries becomes lower than the predetermined value.

Note that the process can be forcibly stopped in the case where an interrupt process is performed during the electric power smoothing operation. As the interrupt process, process related to an operation (acceleration, turn, braking, or the like) by which the state of the automobile changes from a resting state or an idle running state is given.

Figure 8A:
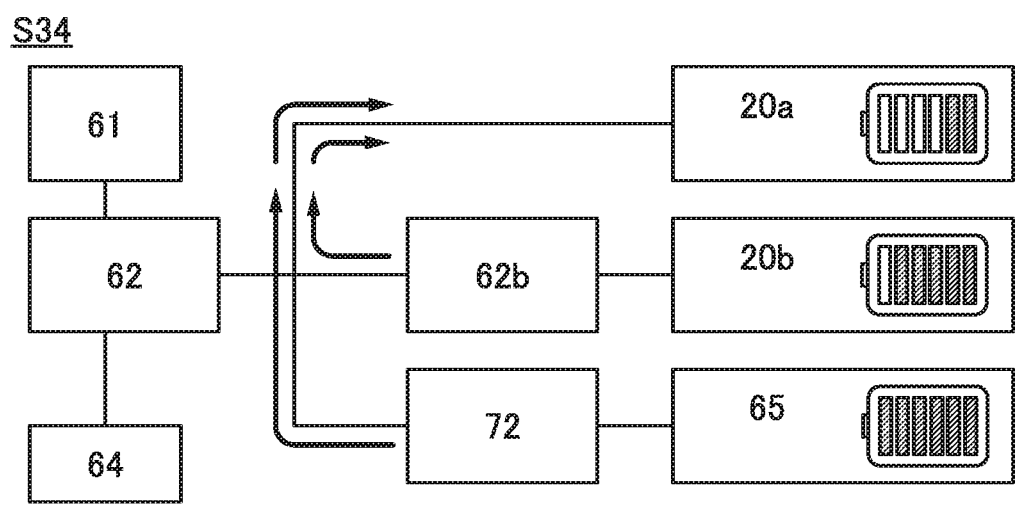
FIG. 8 Drawings illustrating an operation method of an electric power control system of an embodiment.

FIGS. 8(A) and (B) are schematic views illustrating the operation of Step S34.

FIG. 8(A) is a state right after the start of Step S34. In FIG. 8(A), supply of electric power is controlled such that electric power is supplied to the battery 20a, which has the smallest amount of charge among the battery 20a, the battery 20b, and the battery 65, from the other two batteries.

Figure 8B:
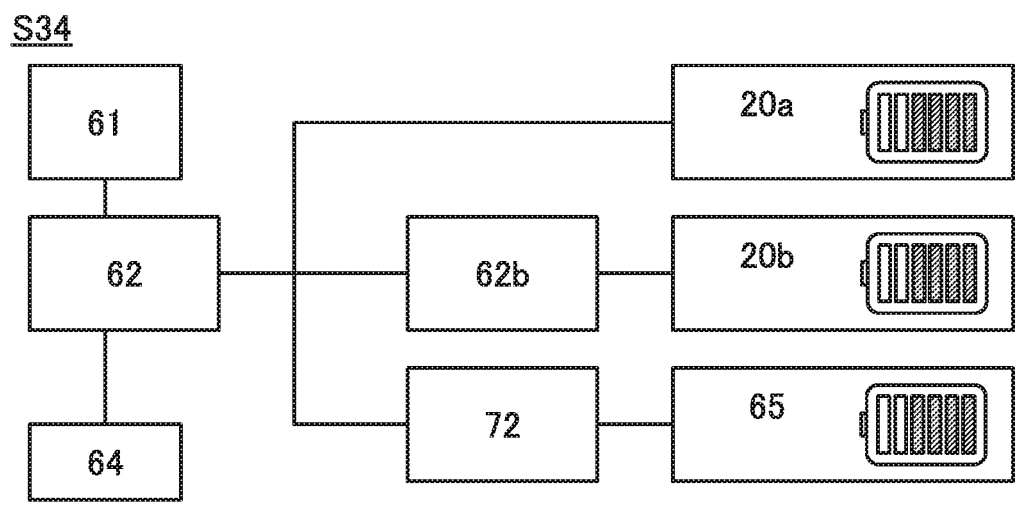

FIG. 8(B) shows a state at the time when the operation of Step S34 is completed. As shown in FIG. 8(B), the amounts of charge of the batteries are smoothed to be comparable.

Note that the operation in which electric power is supplied to the battery with the smallest amount of charge from both of the other two batteries is described here; however, one embodiment is not limited to this and an operation in which electric power is supplied from only the battery with the largest amount of charge, for example, may be employed.

Furthermore, in the case where electric power is supplied from two or more batteries, the supply amount may differ in accordance with the amount of charge of each battery. For example, a battery with a larger amount of charge may supply a larger amount of electric power.

Note that the determination criterion in the above description of the electric power regeneration operation 2 can be employed as the value used for the determination in Step S33.

In this way, the amounts of charge of the batteries can be smoothed by the electric power smoothing operation. Since deterioration of a battery in a fully charged state or a completely discharged state sometimes progresses rapidly, smoothing electric power in this manner and keeping all the batteries from a fully charged state or a discharged state can extend the life of the batteries.

The above is the description of the electric power smoothing operation.

The electric power control method and the electric power control system of one embodiment of the present invention enable a vehicle with a plurality of batteries to transmit electric power between the batteries. Accordingly, in the case where electric power regeneration is performed, it is possible to charge a predetermined battery preferentially. Furthermore, owing to the electric power smoothing operation, the amounts of charge of the batteries can be smoothed. By such a method, reduction in electric power transmission loss, extension of the battery lives, and the like become possible.

Note that one embodiment of the present invention may be achieved in such a manner that a program is stored in a memory portion included in the control unit 61 and read out and executed by a computer or an arithmetic device in the control unit 61. That is, another embodiment of the present invention is the program which makes the control unit 61 execute the operations of the above flows.

[About Electric Power Regeneration Operation]

According to the system of one embodiment of the present invention, regenerative electric power can be generated by rotating the motor 64a or the motor 64b. At this time, force is generated with respect to the wheel 10a or the wheel 10b in the direction stopping the rotation thereof, and this force functions as a brake.

Here, as a method of safety control utilizing a brake, antiskid control is given. Antiskid control is also referred to as ESC (electronic stability control) sometimes. This is a control method in which appropriate braking is operated for each wheel, when an automobile is making a turn and there is a gap between the direction that the driver intends through steering and the direction in which the automobile moves, so as to reduce the gap.

In one embodiment of the present invention, the braking operation at the time when such antiskid control is operated is performed by a motor, whereby regenerative electric power can be obtained.

The method of antiskid control is described with reference to FIGS. 9(A) and (B).

Figure 9A:
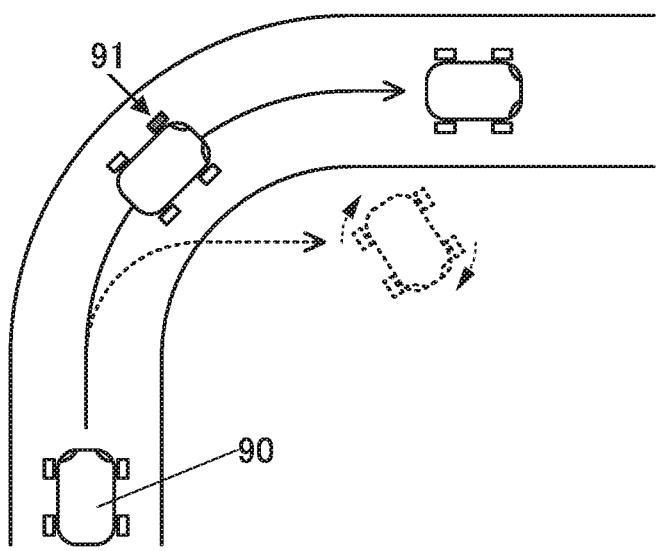
FIG. 9 Drawings each illustrating a method of antiskid control of an embodiment.

In FIGS. 9(A) and (B), how an automobile 90 makes a turn is shown. Here, a case where the antiskid control is operated is indicated by a solid line, and a case without the antiskid control is indicated by a dashed line.

FIG. 9(A) shows an oversteering condition. In other words, it is a case where the ground friction force of the rear wheels becomes smaller than the centrifugal force and the rear wheels deviate outward at the time of turning, so that the direction in which the car body moves deviates inward from the curve. At this time, when appropriate braking is applied to the front wheel that is outside with respect to the turning direction, as indicated by an arrow 91 in the drawing, the automobile can turn the curve with an appropriate turning radius.

Figure 9B:
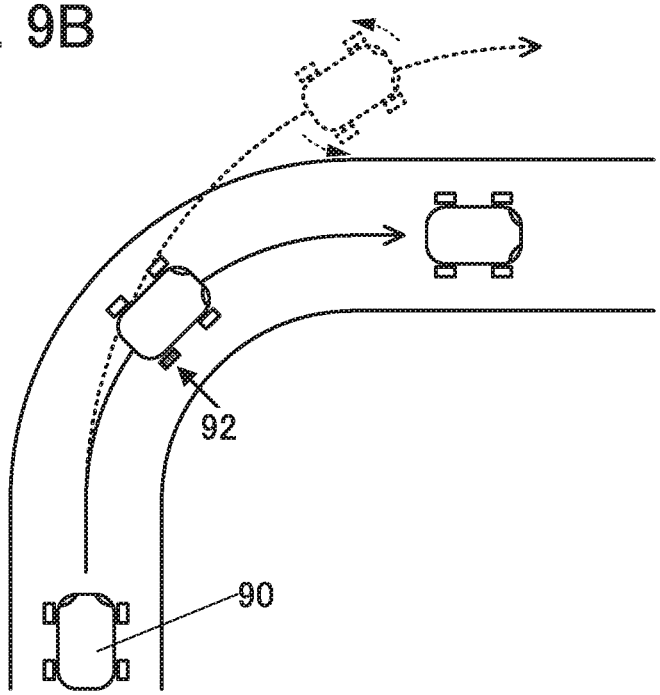

FIG. 9(B) shows an understeering condition. In other words, it is a case where the ground friction force of the front wheels becomes smaller than the centrifugal force and the front wheels deviate outward at the time of turning, so that the direction in which the car body moves deviates outward from the curve. At this time, when appropriate braking is applied to the rear wheel that is inside with respect to the turning direction, as indicated by an arrow 92 in the drawing, the automobile can turn the curve with an appropriate turning radius.

Note that, although an electric power regeneration operation in the antiskid control is described here, one embodiment is not limited to this, and regenerative electric power can be obtained by various controls using a brake. For example, regenerative electric power can be obtained also by a braking operation in an antilock brake system (ABS), a collision avoidance system, a system for reducing an impact at the time of a collision, or the like.

The above is the description of the electric power regeneration operation.

[Other Structure Examples of System]

Hereinafter, examples of the system having a structure different from the system 80 illustrated in FIG. 1 will be described. Note that in the following description, description overlapping with the above description might be omitted.

Structure Example 1

Figure 10:
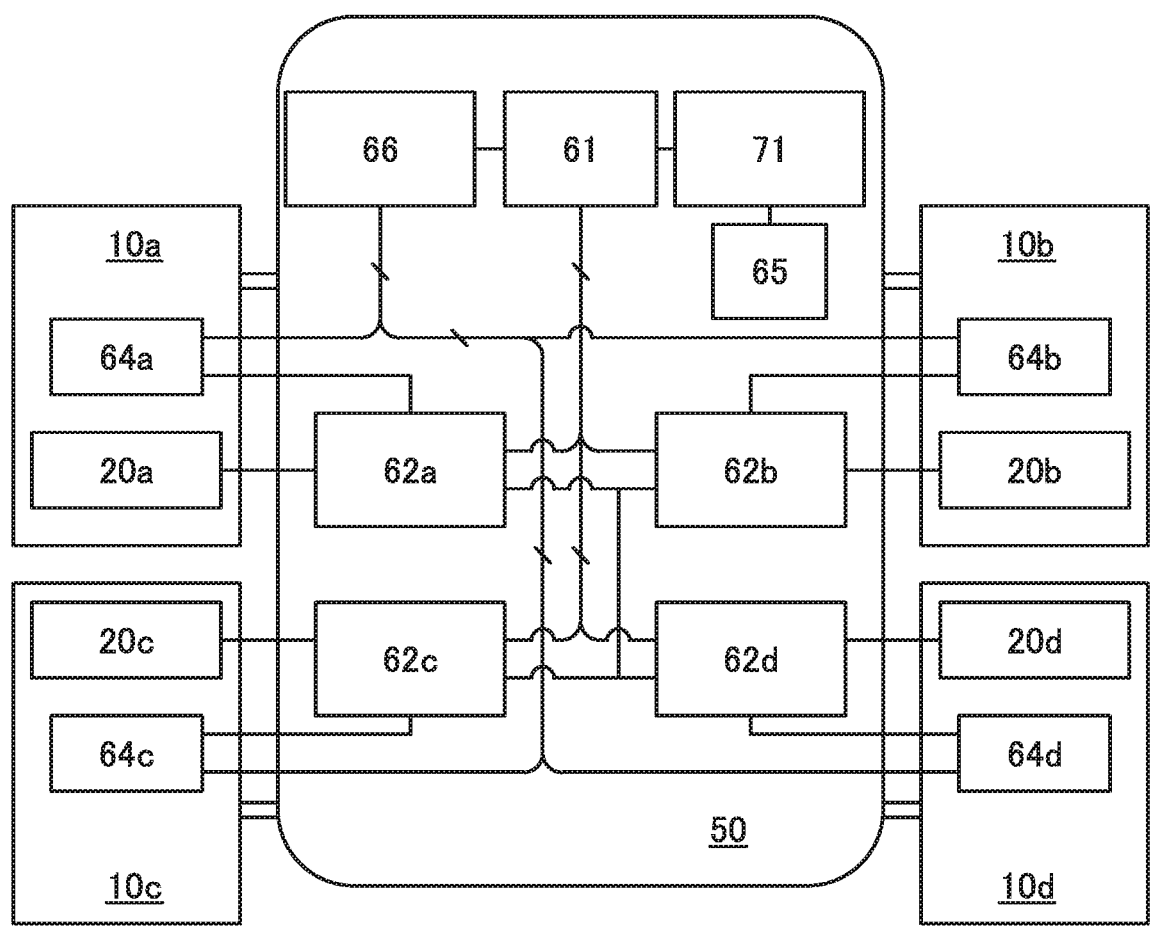
FIG. 10 A drawing illustrating an electric power control system of an embodiment.

A system 80a illustrated in FIG. 10 is different from the system 80 illustrated in FIG. 1 in that each of the four wheels includes a motor and a battery.

The system 80a includes a wheel 10c, a wheel 10d, a battery 20c, a battery 20d, a motor 64c, a motor 64d, an electric power control unit 62c, and an electric power control unit 62d. The electric power control unit 62c is connected to the battery 20c and the motor 64c. The electric power control unit 62d is connected to the battery 20d and the motor 64d.

Each of the electric power control unit 62a, the electric power control unit 62b, the electric power control unit 62c, and the electric power control unit 62d is controlled by the control unit 61, and has a structure capable of transmitting electric power to each other.

Structure Example 2

Figure 11:
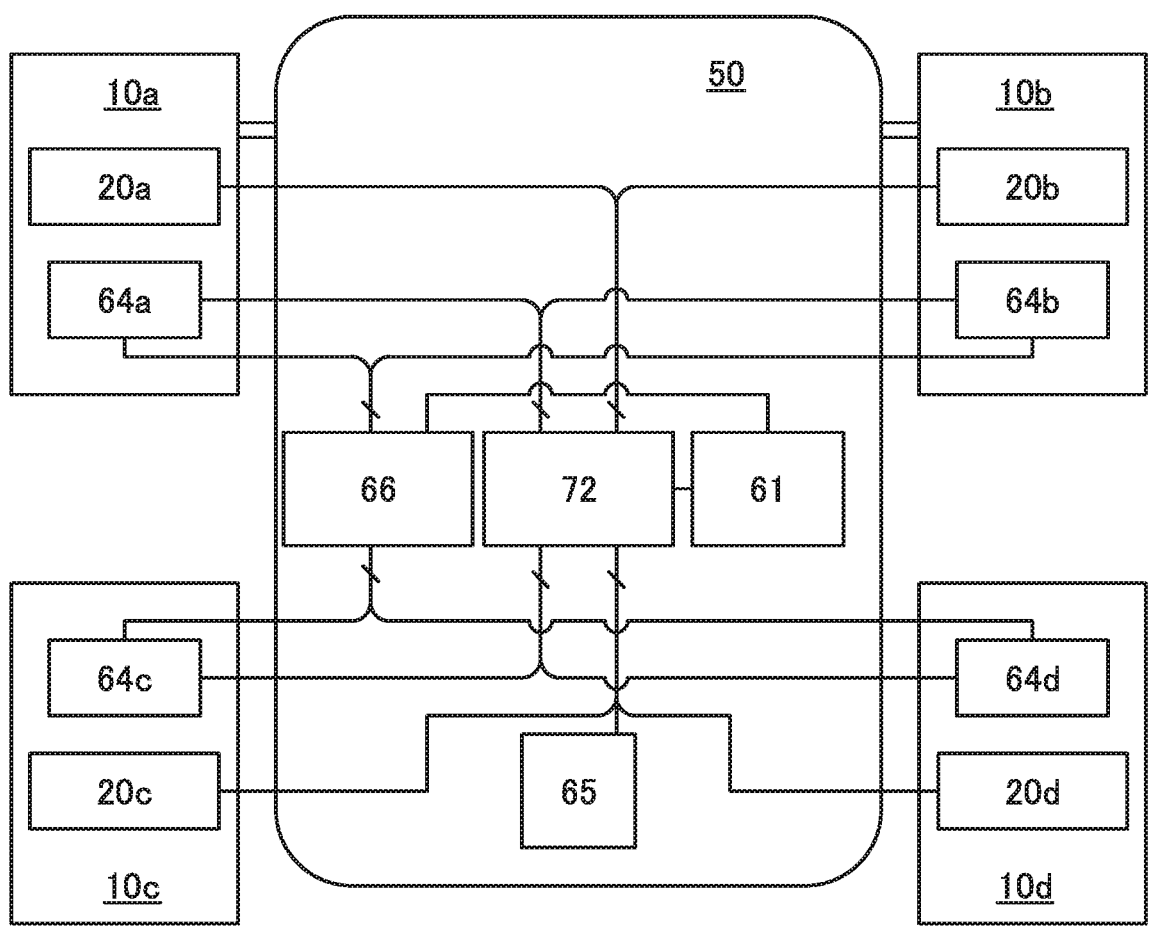
FIG. 11 A drawing illustrating an electric power control system of an embodiment.

A system 80b illustrated in FIG. 11 includes an electric power control unit 72 instead of the four electric power control units in FIG. 10.

The electric power control unit 72 has a function of supplying electric power selectively to the batteries, a function of outputting electric power selectively from the batteries, a function of supplying electric power selectively to the motors, a function of converting regenerative electric power output from the motors, and the like. The use of one electric power control unit 72 in which functions are integrated in this manner can increase the design flexibility of the car body 50, in addition to reducing the number of components.

Furthermore, since the frequency of electric power conversion can be reduced in the case where electric power is transmitted between the batteries, the efficiency of electric power transmission between the batteries can be increased.

Structure Example 3

Figure 12:
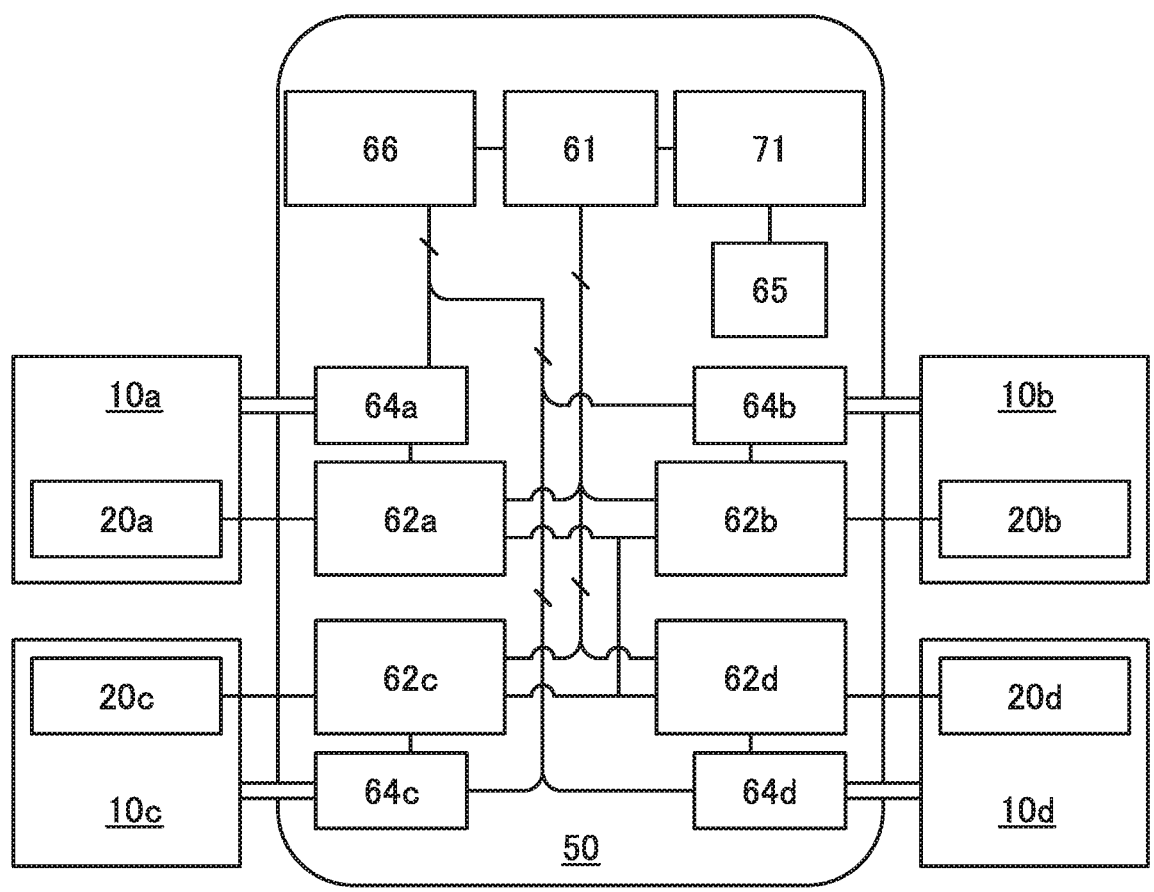
FIG. 12 A drawing illustrating an electric power control system of an embodiment.

A system 80c illustrated in FIG. 12 shows an example where the motors provided in the wheels in FIG. 10 are placed in the car body 50 side.

By providing the motor 64a, for example, in the car body 50 in this manner, the motor 64a and the electric power control unit 62a that constitute a pair can be placed close to each other; thus, the transmission efficiency of electric power can further be increased.

In addition, the structure of the wheel 10a and the like can be simplified, so that replacement of the wheel 10a and the like is easier. Furthermore, the wheel 10a and the like can be more lightweight.

Structure Example 4

Figure 13:
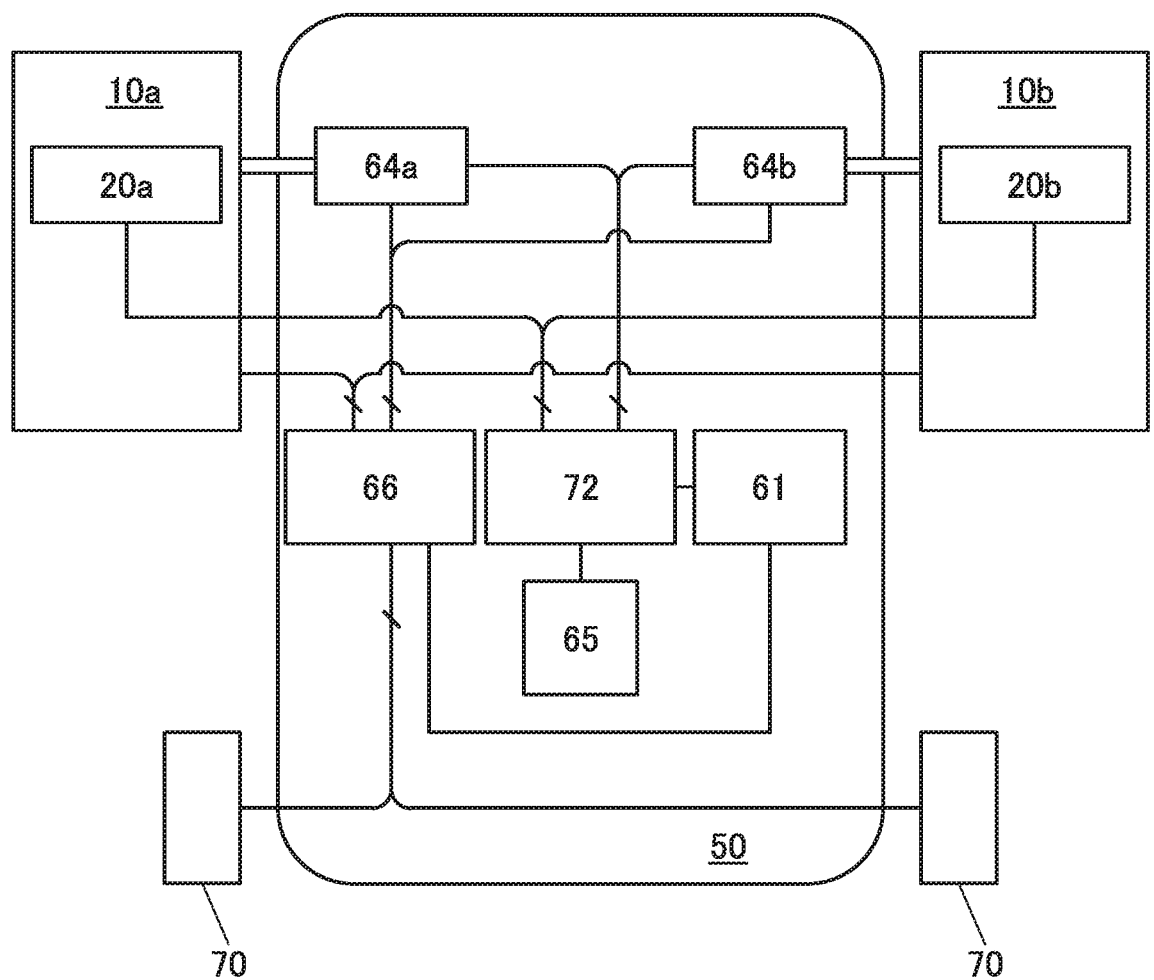
FIG. 13 A drawing illustrating an electric power control system of an embodiment.

A system 80d illustrated in FIG. 13 is different from the system 80 illustrated in FIG. 1 in that the motor 64a and the motor 64b are provided in the car body 50 and that one electric power control unit 72 that is connected to the batteries is included.

Structure Example 5

Figure 14:
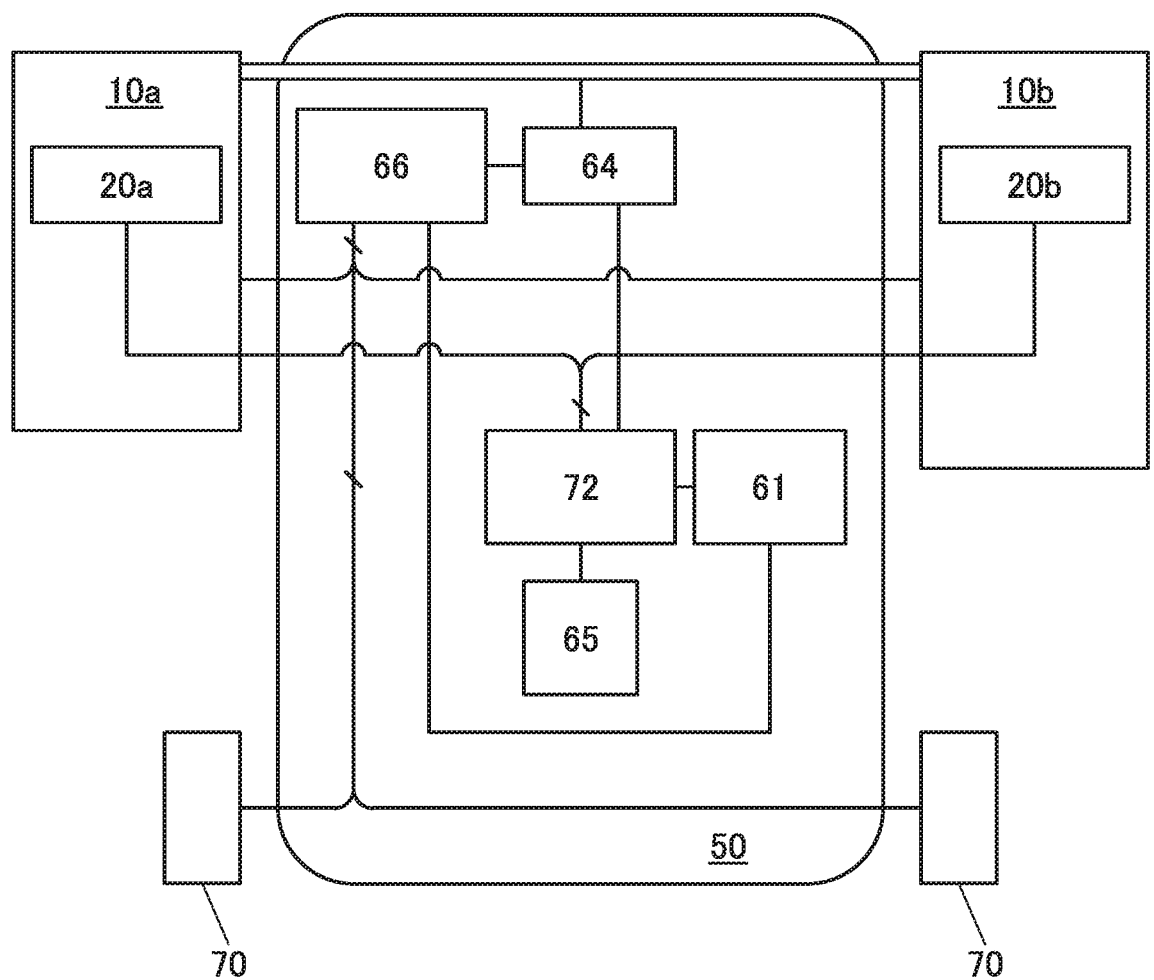
FIG. 14 A drawing illustrating an electric power control system of an embodiment.

A system 80e illustrated in FIG. 14 shows an example where the two wheels (the wheel 10a and the wheel 10b) are driven by one motor 64 provided in the car body 50. Furthermore, the system 80e includes one electric power control unit 72 that is connected to the batteries.

Structure Example 6

Figure 15:
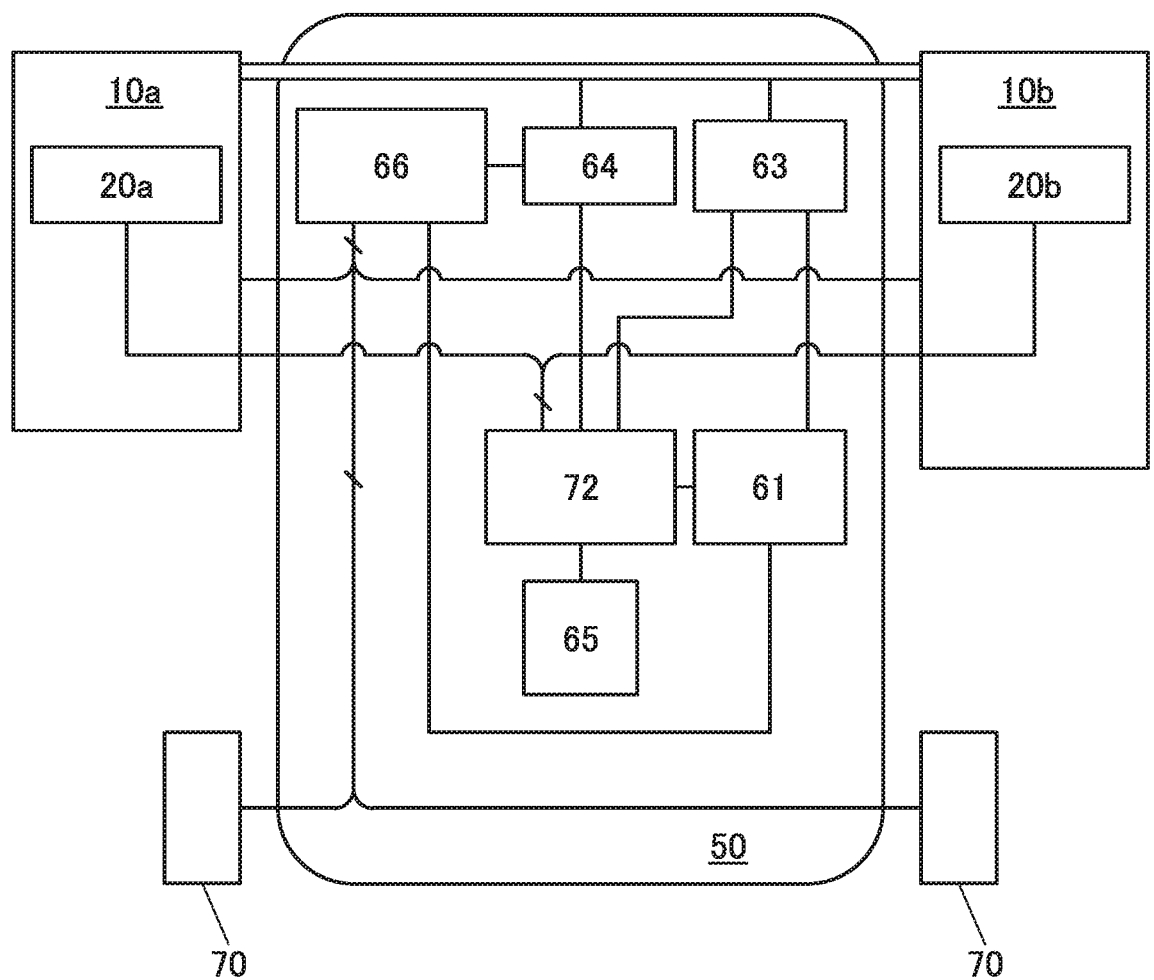
FIG. 15 A drawing illustrating an electric power control system of an embodiment.

A system 80f illustrated in FIG. 15 shows an example where an engine 63, which is an internal-combustion engine, is added to the system 80e illustrated in FIG. 14. It can be said that the automobile that can be applied to the system 80f is a hybrid car, which can move with two kinds of power, the engine and the motor.

The control unit 61 can control the operation of each of the motor 64 and the engine 63. Accordingly, switching between a mode of driving only with the engine 63, a mode of driving only with the motor 64, and a mode of driving with the use of the engine 63 and the motor 64 in combination is possible.

Furthermore, the engine 63 also functions as a generator. Electric power generated by the engine 63 is supplied through the electric power control unit 72 to the battery 65, the battery 20*a*, or the battery 20*b*, or the electric power is supplied to the control unit 61, the braking control unit 66, the motor 64, or the like.

Note that a structure where the engine 63 is used as a generator without being used as power for driving the wheel 10*a* and the wheel 10*b* may be employed.

The above is the description of the other structure examples of the system.

At least part of this embodiment can be implemented in combination with any of the other embodiments described in this specification as appropriate.

Embodiment 2

In this embodiment, a structure example of a wheel that can be used in the electric power transmission system or the like described in Embodiment 1 as an example, and a vehicle (e.g., an automobile) to which the wheel can be attached will be described.

[Structure Example of Wheel]

Figure 16A:
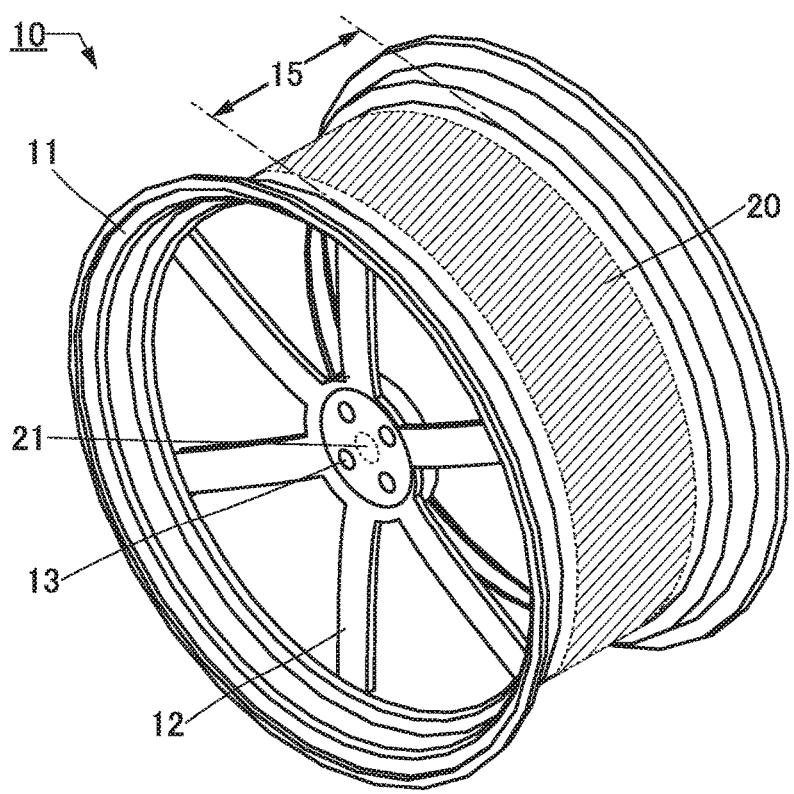
FIG. 16 Drawings each illustrating a wheel of an embodiment.

In FIG. 16(A), a schematic perspective view of a wheel 10 of one embodiment of the present invention is shown. The wheel 10 includes a rim portion 11, a disk portion 12, a battery 20, and a connector 21.

The wheel 10 can be installed in a vehicle such as an automobile using a tire, or the like. An automobile is an embodiment of a vehicle. As an automobile, a specialized vehicle such as a civil engineering work vehicle and a crane truck is included, in addition to a car, a truck, and a bus. In addition, the wheel 10 of one embodiment of the present invention can be installed in a one-wheeled, two-wheeled, or three-wheeled vehicle or a vehicle with five or more tires, in addition to a four-wheeled vehicle. As a two-wheeled vehicle, a structure with two wheels attached to a car body, one behind the other, like a motorcycle may be employed, or a structure with two tires provided on sides of a car body face-to-face may be employed. The system can also be applied to a bicycle, an electric bicycle, a power-assisted bicycle, a tire for an airplane, a tire for a helicopter, a tire for a vertical take-off and landing aircraft, an amphibious car, a tank, or the like.

In addition, the wheel can be applied to a vehicle that does not use a tire. For example, it can be used for a wheel of a car that moves on a rail as a guideway. For example, it can be used for a vehicle such as a railroad (including an electric train, a steam train, a steam locomotive, and the like), a streetcar, a cable car, and the like.

Furthermore, one embodiment of the present invention can be applied to a toy that copies the above-mentioned vehicle.

In the rim portion 11, as it gets closer to the outside in a width direction, the radius of curvature gets larger. Furthermore, the rim portion 11 has a cylindrical portion 15 at the central part in the width direction. The battery 20 is provided in a state of being bent along the portion 15 of the rim portion 11. In FIG. 16(A), an example where the battery 20 is provided inside the portion 15 of the rim portion 11 is shown.

The disk portion 12 includes a plurality of bolt holes 13 for attachment to the car body 50 described later. Furthermore, the connector 21 is provided in the disk portion 12.

The connector 21 is electrically connected to the battery 20. In addition, the connector 21 includes a contact point to be electrically connected to a connector of the car body of the automobile or the like.

Figure 16B:
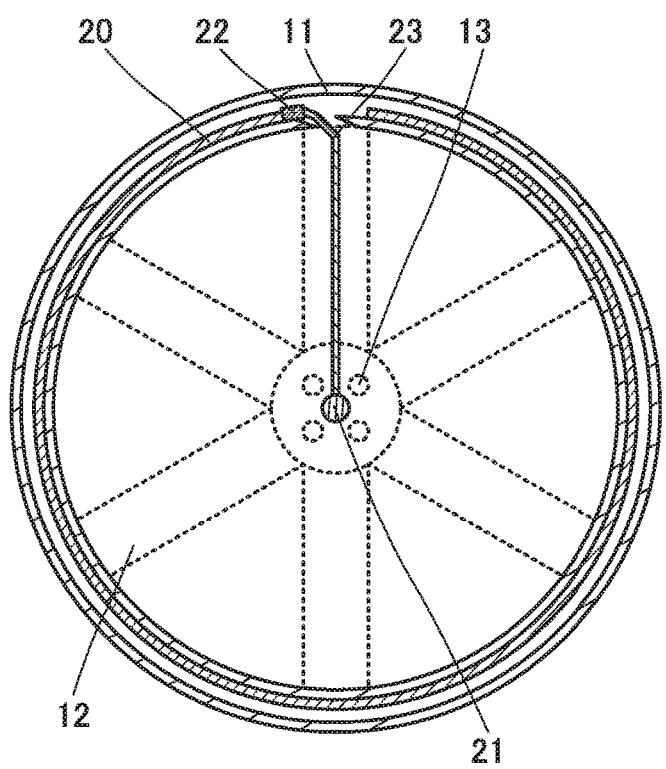

FIG. 16(B) is a schematic cross-sectional view in a circumferential direction of the rim portion 11. In FIG. 16(B), the disk portion 12 and the like are indicated by dashed lines to show the position relation.

The rim portion 11 has a two-layered structure at the cylindrical portion 15, and has a space therein. The battery 20 is placed in the space inside the rim portion 11. The battery 20 is placed in a state of being curved along the curvature of the rim portion 11. In other words, the battery 20 is placed so as to be wrapped around part of the cylindrical portion 15 of the rim portion 11. Such a structure is preferable because unbalance of the center of gravity of the wheel 10 can be inhibited.

The battery 20 preferably has a function of being bent along a curved surface. In particular, the battery 20 preferably is a secondary battery sealed with a film. The radius of curvature with which the battery 20 can be bent is a radius of curvature that is at least smaller than the inner diameter of the rim portion 11. The detail of a secondary battery that is suitable for the battery 20 will be described later.

The battery 20 is preferably fixed to the rim portion 11 with an adhesive or a pressure sensitive adhesive. At this time, it is preferable to use an adhesive or a pressure sensitive adhesive from which the battery 20 can be detached without being damaged, in which case the replacement of the battery 20 when deteriorating is easy.

Note that although a structure where the battery 20 is fixed to the rim portion 11 is described here, a structure where the battery 20 is not fixed to the rim portion 11 may also be employed. For example, with a structure where the wheel 10 has a support portion to which the battery 20 is fixed and the support portion idles or does not rotate with respect to the car body when the rim portion 11 rotates with respect to the car body, the weight of a portion of the wheel 10 that rotates can be made lighter and the motion performance of the automobile can be improved.

The battery 20 includes a terminal 22. The terminal 22 of the battery 20 and the connector 21 provided on the disk portion 12 are electrically connected to each other through a cable 23. The cable 23 is provided inside the disk portion 12. It is preferable that the terminal 22 and the cable 23, or the cable 23 and the connector 21 have a detachable mechanism, in which case replacement of the battery 20 is easy.

Note that although a structure where the battery 20 includes only the terminal is employed here, a structure where the battery 20 includes a BMU (battely management unit) may also be employed. The BMU can monitor overcharge and overdischarge of the battery 20, monitor overcurrent, control a cell balancer, manage the deterioration condition of the battery, calculate the battery remaining ((charging rate) state of charge: SOC), control a cooling fan of a driving secondary battery, and control detection of failure, for example. Furthermore, when the BMU is provided in the battery 20, it is preferable to have a function of outputting data of the battery 20 obtained by the BMU to the electric power control unit 62 included in the car body 50 described later.

Figure 16C:
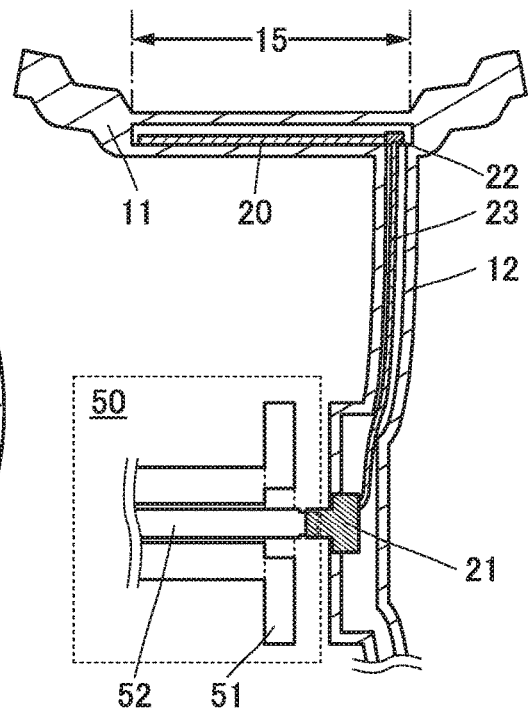

In FIG. 16(C), a schematic cross-sectional view of the rim portion 11 in a width direction, in a state of being attached to the car body 50 of an automobile is shown.

FIG. 16(C) shows a case where the disk portion 12 is shaped such that part thereof has a space. The cable 23 is placed in the space of the disk portion 12 and electrically connected to the connector 21 located at the center of the disk portion 12.

The car body 50 includes a fixing portion 51 and a connector 52. The fixing portion 51 has a function of transmitting power from a device (engine device, motor) that generate power, such as an engine or a motor included in the car body 50, to the wheel 10. With the rotation of the fixing portion 51, the wheel 10 that is fixed to the fixing portion 51 can be rotated. The fixing portion 51 can be fixed to the disk portion 12 with a bolt in a region not shown in the drawing. The connector 52 has a contact point at the end to be electrically connected to the connector 21, and has a mechanism to be engaged with the connector 21.

The connector 52 preferably has a mechanism with which electrical connection is not broken by the rotation, for example. A rotatable connector (rotary connector) formed using liquid metal, such as mercury or gallium, a slip ring having a brush, or the like can be used, for example. Use of the rotatable connector can prevent problems caused by wear and thus is preferable.

Since the connector 21 and the connector 52 are electrically connected to each other, electric power charged in the battery 20 can be supplied to the car body 50. Furthermore, it is also possible to charge the battery 20 with electric power input from the car body 50. Furthermore, a structure where data from the above-mentioned BMU can be transmitted between the connector 21 and the connector 52 may be employed.

Thus, the wheel 10 of one embodiment of the present invention can be used as an auxiliary power source of an automobile, for example. Furthermore, in the case where the battery 20 having a sufficient capacity is mounted on the wheel 10, it becomes possible to use the battery 20 as a main power source of the automobile, without a power source being mounted on the automobile. With the use of the wheel 10 like this, it becomes possible to reduce the volume of a battery mounted on the automobile, so that space-saving in the automobile can be achieved. In addition, the design flexibility of the automobile can be improved. For example, the living space or the space of the trunk can be expanded.

Figure 17:
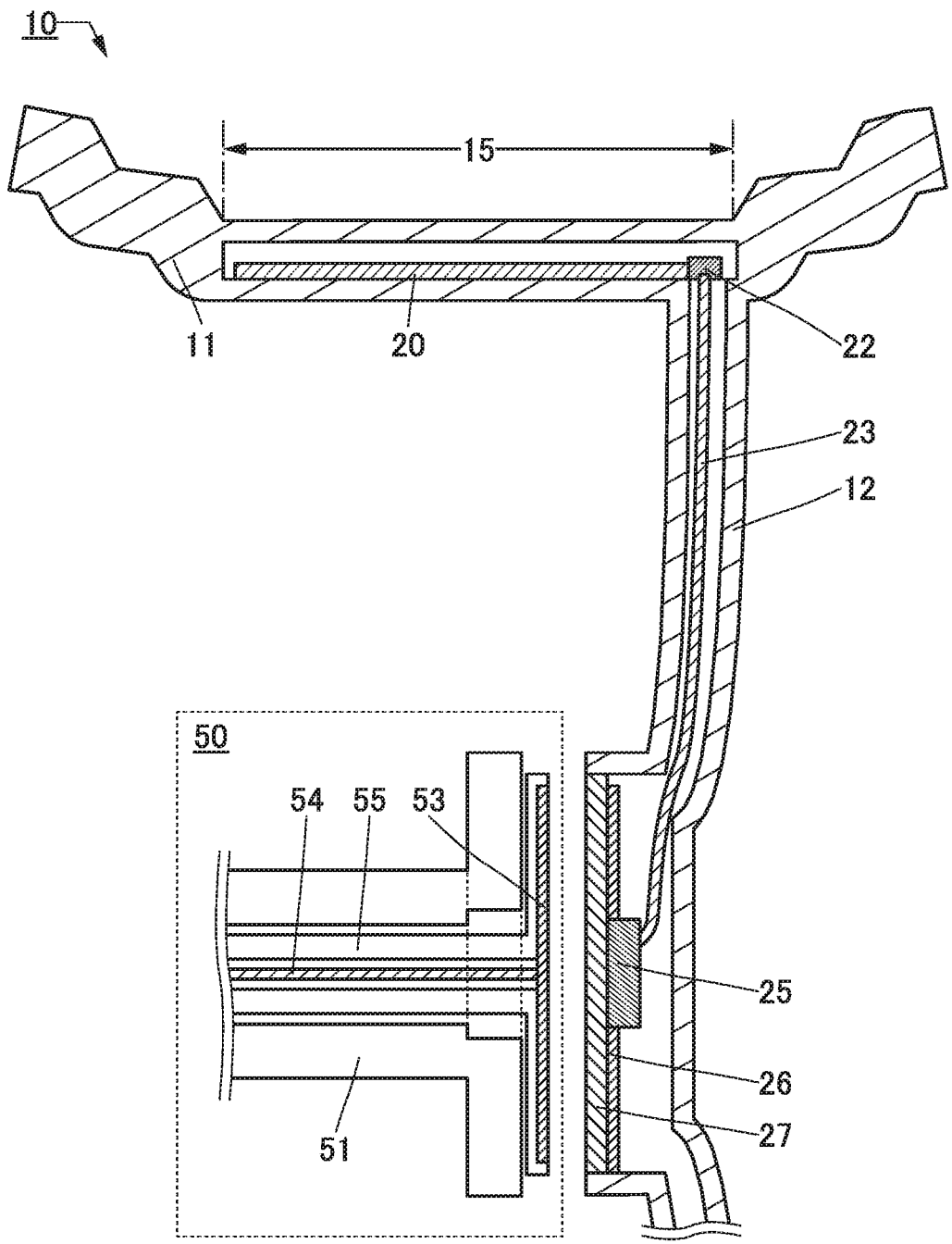
FIG. 17 A drawing illustrating a wheel of an embodiment.

Although a case where the connector 21 and the connector 52 are used as electric power transmission mechanisms respectively provided in the wheel 10 and the car body 50 is described above, a structure utilizing transmission and reception of electric power using an electromagnetic induction method, a magnetic resonance method, an electric wave method, or the like (also referred to as contactless electric power transmission, non-contact electric power transmission, wireless power feeding, or the like) requires no physical contact point and thus is preferable. In FIG. 17, an example where contactless electric power transmission is performed between the wheel 10 and the car body 50 is shown.

In FIG. 17, the wheel 10 includes a circuit 25 and an antenna 26, instead of the above connector 21. Here, a structure including the circuit 25 and the antenna 26 may be referred to as a wireless module. The circuit 25 is electrically connected to the battery 20 through the cable 23. Furthermore, the antenna 26 is electrically connected to the circuit 25.

The circuit 25 has a function of transmitting electric power of the battery 20 through the antenna 26 to an antenna 53 attached to the car body 50. In addition, the circuit 25 has a function of converting electric power received by the antenna 26 to electric power supplied to the battery 20.

The car body 50 includes the antenna 53, a cable 54, and an antenna support portion 55, instead of the connector 52. The antenna 53 is attached to a position that faces the antenna 26 when the wheel 10 is attached to the car body 50. The antenna support portion 55 has a function of supporting the antenna 53. The antenna 53 and the antenna support portion 55 may have a hole or a notch portion so as not to physically interfere with the bolt for fixing the fixing portion 51 and the wheel 10. The cable 54 has a function of electrically connecting a circuit (not shown) provided inside the car body 50 and the antenna 53 to each other. As the circuit, one having a similar function to that of the above circuit 25 can be used.

In FIG. 17, an example where a window portion 27 is provided in part of the disk portion 12 that is located between the antenna 26 and the antenna 53 is shown. For the window portion 27, a material that does not inhibit the propagation of signals between the antenna 26 and the antenna 53 can be used. The material of the window portion 27 can be appropriately selected in accordance with the method of contactless electric power transmission; for example, a material with a higher insulating property, higher permittivity, or less likelihood of shielding wireless signals, electric waves, electromagnetic waves, or the like, than a material used for the disk portion 12 can be used.

With such a structure, transmission and reception of electric power can be easily performed even when the wheel 10 rotates. Furthermore, the structure is preferable because it does not have a physical contact point and problems of wear and damage do not occur.

Figure 18A:
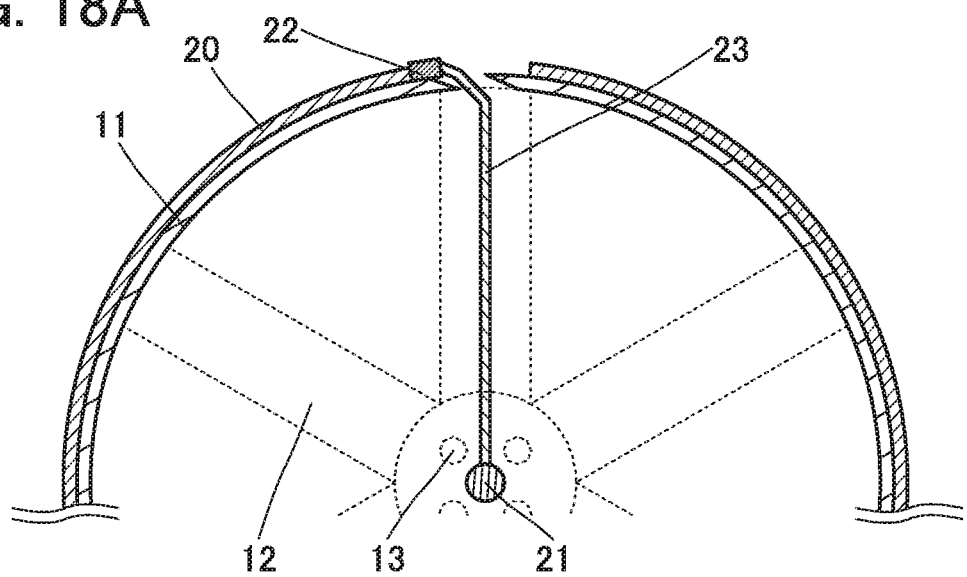
FIG. 18 Drawings each illustrating a wheel of an embodiment.

In FIGS. 18(A) and (B), examples of modes of the rim portion 11 different from the above are shown.

Figure 18B:
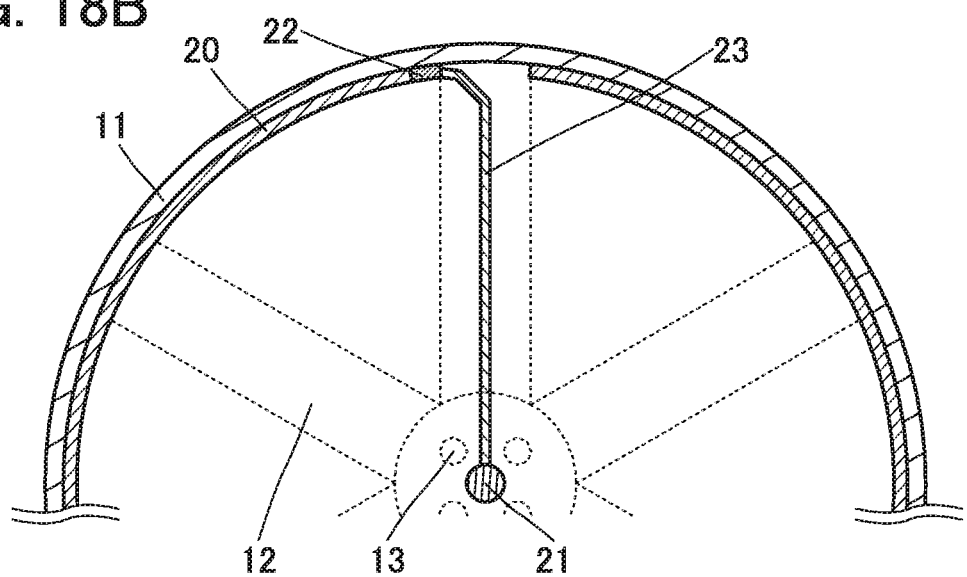

Although an example where the rim portion 11 has a hollow structure and the battery 20 is provided inside the rim portion 11 is described above, one embodiment is not limited to this; a structure where the battery 20 is wrapped around or pasted on the surface of the rim portion 11 may be employed. In FIG. 18(A), an example where the battery 20 is wrapped around the outer circumference of the rim portion 11 is shown. Here, when a tire (not shown) is attached to the wheel 10, the surface of the outer circumference of the rim portion 11 is covered with the tire. Accordingly, the battery 20 would not be exposed even when the battery 20 is wrapped around the outer circumference of the rim portion 11 in this manner, which is preferable. Furthermore, in the case where the exterior of the battery 20 has sufficient weatherability, a structure where the battery 20 is provided along the inner circumference of the rim portion 11 as shown in FIG. 18(B) may be employed.

Figure 19A:
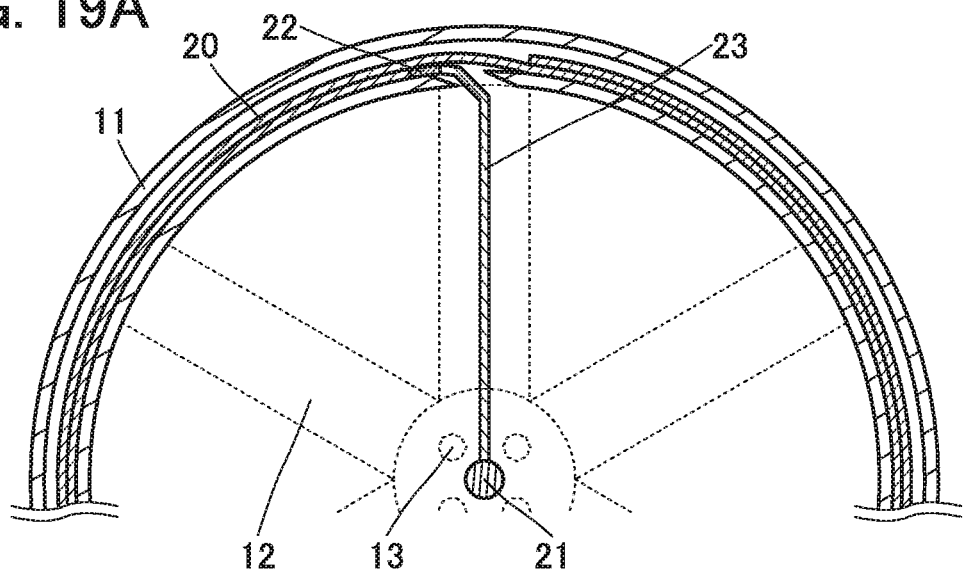
FIG. 19 Drawings each illustrating a wheel of an embodiment.

In FIGS. 19(A) and (B), examples of different modes of the battery 20 are shown.

Although examples where the battery 20 covers a range shorter than one lap of the circumference of the cylindrical portion 15 of the rim portion 11 are described above, a structure where the battery 20 is wrapped to cover more than one lap may be employed. In FIG. 19(A), an example where the battery 20 is wrapped about two laps with respect to the rim portion 11 is shown. The longer the length of the battery 20 is, the larger the capacity of the battery 20 can be, which is preferable.

Figure 19B:
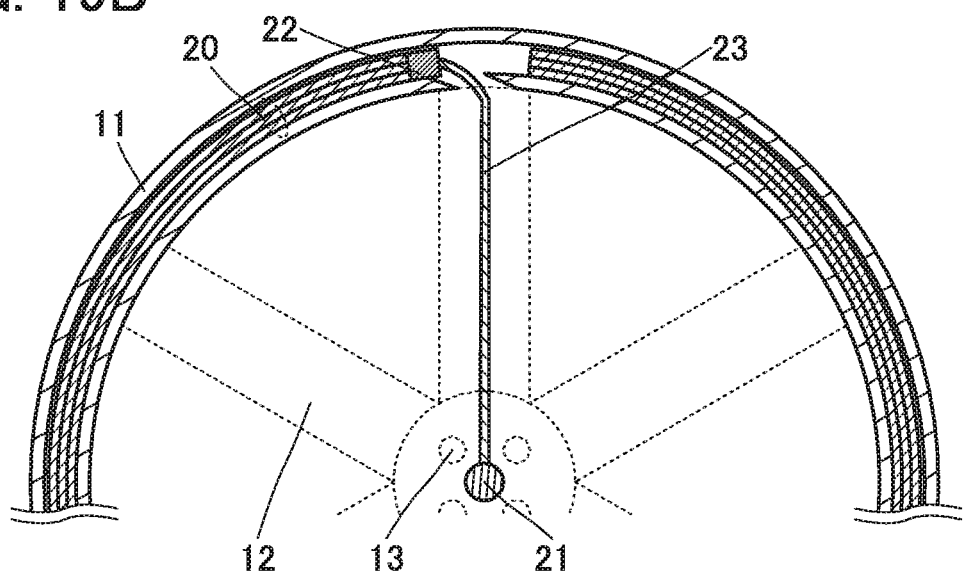

Furthermore, as shown in FIG. 19(B), a structure where the battery 20 includes a plurality of belt-like secondary batteries having the terminal 22 in common may be employed. For example, a structure where a plurality of the batteries 20 shown in FIG. 19(B) or the like is stacked and used can be employed. With such a structure, a resistance component of the battery 20 can be reduced. Although a larger number of members such as a film of the battery 20 are required, as compared with the structure shown in FIG. 19(A), the size of one secondary battery can be made comparatively small, so that large-sized equipment need not be introduced for the manufacture, which is preferable.

In FIGS. 20(A), (B), and (C), examples of using batteries with different modes are shown.

Although the case where the belt-like battery 20 sealed with a film is used is described above, batteries with different shapes can be used.

In FIG. 20(A1), an example where cylindrical batteries 41 are used is shown. In addition, the external appearance of the battery 41 is shown in FIG. 20(A2). The battery 41 is sealed with a cylindrical exterior member, and includes a pair of terminals 45. With the use of a plurality of cylindrical batteries 41, the batteries 41 can be placed at high density inside the rim portion 11.

In FIG. 20(B1), an example where prism-like batteries 42 are used is shown. In addition, the external appearance of the battery 42 is shown in FIG. 20(B2). With the use of a plurality of prism-like batteries 42, capacity per volume of one battery 42 can be increased, and the number of batteries to be provided in one wheel 10 can be reduced as compared with the case where the cylindrical batteries 41 are used.

In FIG. 20(C1), an example where columnar batteries 43 each having a curved surface in part thereof are used is shown. In addition, the external appearance of the battery 43 is shown in FIG. 20(C2). It is preferable that the radius of curvature of the curved surface of the battery 43 be substantially the same as the radius of curvature of the inner wall of the rim portion 11. In that case, as shown in FIG. 20(C1), the space between the battery 43 and the rim portion 11 can be reduced and the batteries 43 can be placed at high density. The battery 43 may have a columnar shape whose section has roughly a fan-like shape, for example.

The battery 41, the battery 42, and the battery 43 described here as examples need not have a bendable function; a battery that is sealed with an exterior member with high hardness such as a metal may be used therefor. Furthermore, as each of the battery 41, the battery 42, and the battery 43, a winding or stacked secondary battery can be used.

The above is the description of the structure examples of the wheel.

Application Example

Structure examples of the wheel of one embodiment of the present invention and an automobile to which the wheel can be attached will be described below.

Figure 21:
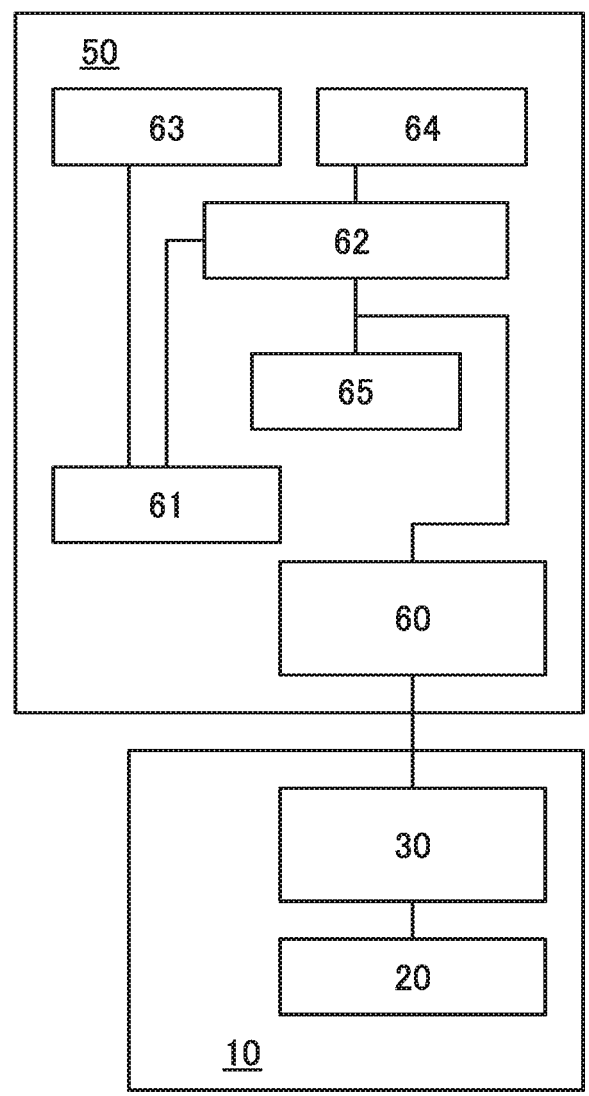
FIG. 21 A drawing illustrating a car body and a wheel of an embodiment.

In FIG. 21, a block diagram that describes major structures of the car body 50 of the automobile and the wheel 10 is shown. Here, a structure of a hybrid car that uses both an engine and a motor as devices (engine device, motor) generating power will be described as an example.

The wheel 10 includes the battery 20 and an electric power transmission mechanism 30.

The above-mentioned connector 21 and the wireless module including the circuit 25 and the antenna 26 correspond to the electric power transmission mechanism 30.

The car body 50 is provided with an electric power transmission mechanism 60, the control unit 61, the electric power control unit 62, the engine 63, the motor 64, the battery 65, and the like.

The above-mentioned connector 52, a wireless module including the antenna 53, the cable 54, the circuit, and the like correspond to the electric power transmission mechanism 60.

The electric power transmission mechanism 30 and the electric power transmission mechanism 60 have structures that can transmit/receive electric power to/from each other; the above structures are just examples and one embodiment is not limited thereto.

The engine 63 and the motor 64 are devices that produce power for rotating the wheel 10. The motion of the engine 63 is controlled by the control unit 61. The motor 64 is driven by electric power supplied from the electric power control unit 62.

The control unit 61 has a function of controlling power of the automobile. Specifically, it can control driving of the engine 63, the electric power control unit 62, and the like. In addition to that, the control unit 61 may have a function of comprehensibly controlling a variety of electronically-controlled auxiliary devices. As a typical example of the control unit 61, an ECU (engine control unit) can be used. Furthermore, an ECU having a function that is unique to an EV, an HEV, or a PHEV is preferably used in accordance with the driving method of the automobile.

The electric power control unit 62 controls the amount of electric power supply to the motor 64, in response to orders from the control unit 61. The electric power control unit 62 can be referred to as a PCU (power control unit).

Furthermore, the electric power control unit 62 preferably has a function of switching the battery 65 included in the car body 50 and the battery 20 included in the wheel 10, in accordance with the states of charge of the batteries. In the case where the battery 65 is used as a main power source, for example, when the charging rate of the battery 65 decreases to a certain level or lower, the motor 64 and the like can be driven with the use of electric power from the battery 20. With such operation, the battery 20 can be used as an auxiliary power source.

In the case of managing the states of charge of the battery 65 and the battery 20, the electric power control unit 62 has the function of the above-mentioned BMU; alternatively, the battery 65 and the battery 20 have structures with the BMU, and the electric power control unit 62 may take control in accordance with data supplied from the BMUs.

Furthermore, it is preferable that the electric power control unit 62 have a function of charging the battery 65 and the battery 20 by using electric power generated by the motor 64 at the time of deceleration (also referred to as an electric power regeneration function).

As the electric power control unit 62, a structure including a step-up circuit (converter) that increases a voltage output from the battery 65 or the battery 20 to a voltage driving the motor 64, a conversion circuit (inverter) that converts a direct current voltage to an alternating current voltage for driving the motor 64, and a computer that controls these may be employed. In addition, in the case where the electric power regeneration function is added, a conversion circuit that converts an alternating current voltage output from the motor 64 to a direct current voltage, a step-down circuit that lowers it to a voltage for charging the battery 65 and the battery 20, and the like are preferably provided.

Note that although the structure of an HEV provided with both the engine 63 and the motor 64 is described as an example here, a structure in which the engine 63 is not provided is employed for an EV. Furthermore, for a PHEV, a structure further provided with a socket is employed, the structure in which the electric power control unit 62 has a function of controlling charging of the battery 65 and the battery 20, using electric power supplied from the outside through the socket.

The above is the description of an application example.

Modification Examples

Application examples which are partly different from the above application example will be described below.

Figure 22A:
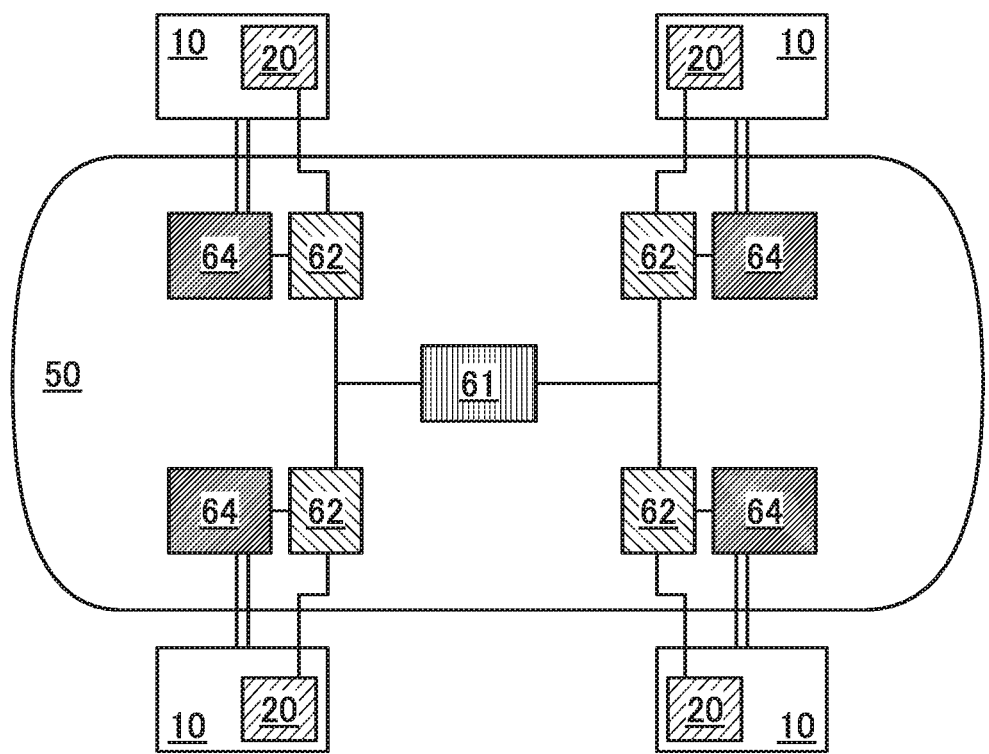
FIG. 22 Drawings each illustrating a car body and wheels of an embodiment.

In FIG. 22(A), a schematic view of the car body 50 to which the wheels 10 are attached is shown. The car body 50 shown in FIG. 22(A) includes one control unit 61, four motors 64, and four electric power control units 62. One motor 64 and one electric power control unit 62 are placed near a portion to which one wheel 10 is attached.

The control unit 61 can control the four electric power control units 62. Electric power of the battery 20 included in one wheel 10 is converted to electric power for driving the motor 64 by the electric power control unit 62 placed nearby. With the rotation of the motor 64, the wheel 10 connected thereto rotates.

In this manner, when a structure where each of the four wheels 10 is provided with a motor such as the motor 64 is employed, each of the four wheels 10 can rotate independently. In addition, the rotation directions of the four wheels 10 can be controlled separately from each other. Accordingly, move of the car body 50 in a direction that was impossible for a conventional automobile becomes possible, such as move of the car body 50 in a lateral direction, rotation of the car body 50 at the place, or the like.

In this manner, placing the electric power control unit 62 and the motor 64 near the wheel 10 can reduce loss of electric power from the battery 20 to the electric power control unit 62.

Figure 22B:
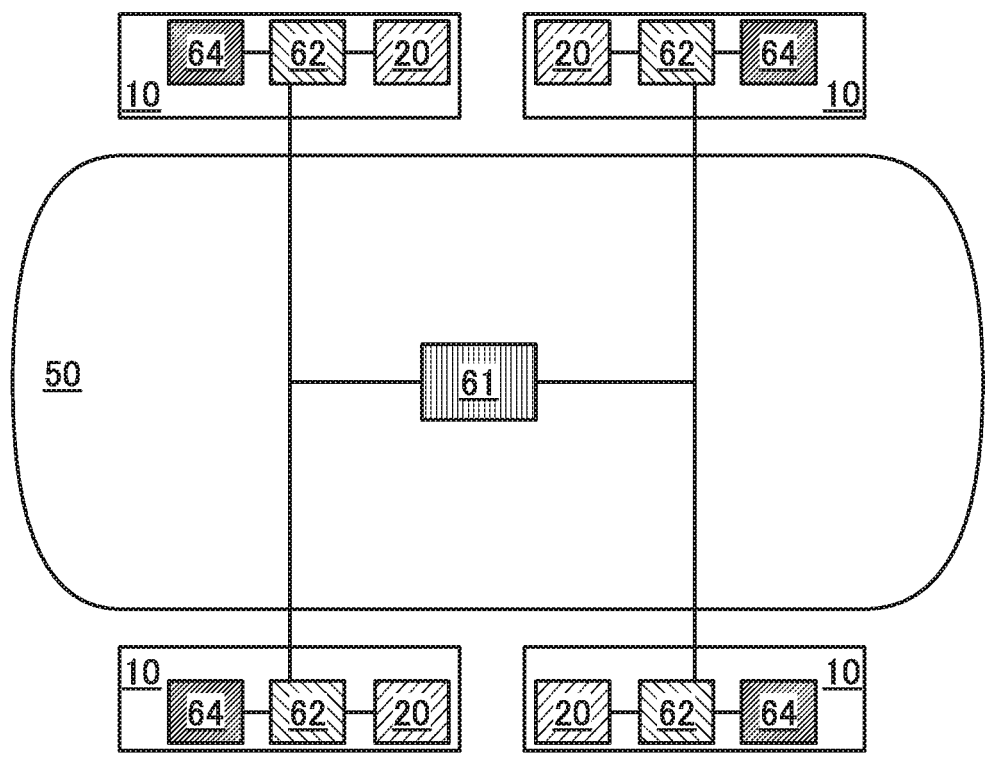

In FIG. 22(B), an example where the wheel 10 includes the electric power control unit 62 and the motor 64 in addition to the battery 20 is shown. A structure where the wheel 10 is provided with the motor 64 can be referred to as an in-wheel motor. With such a structure, the motor 64 provided in each wheel 10 can be driven by electric power of the battery 20. With such a structure, move of the car body 50 is possible even when the car body 50 is heavily damaged in an accident, for example.

In addition, since the electric power control unit 62 and the motor 64 can be provided in the wheel 10, only mechanisms such as the control unit 61 that controls the four wheels 10 need to be placed in the car body 50, and the structure thereof can be significantly simplified. Accordingly, the design flexibility of the car body 50 can be improved, and space-saving can be achieved.

Note that in FIGS. 22(A) and (B), a structure including the above-mentioned battery 65, engine 63, and the like may be employed.

The above is the description of the modification examples.

Although the structure where the battery 20 is included in the wheel 10 to which a tire is attached is described above as one embodiment of the present invention, one embodiment is not limited thereto. A structure where the battery 20 is provided in a wheel having a function of rotating may be employed, for example. When such a structure is applied to a wheel of the car body, the battery 20 included in the wheel can be used as an auxiliary power source or a main power source. As an example, the battery 20 can be applied to a flywheel. In particular, a structure where the battery 20 is provided in a position close to the outer circumference of a flywheel can increase the moment of inertia generated by the flywheel.

Here, a semiconductor device such as a transistor in which silicon carbide, gallium nitride, or an oxide semiconductor is used is preferably used in an electronic component included in the electric power transmission mechanism 60, the control unit 61, the electric power control unit 62, or other devices in the car body, or an electronic component used for the electric power transmission mechanism 30, the BMU, or the like in the wheel 10.

In particular, an oxide semiconductor having a wider band gap than silicon is preferably used. The use of a semiconductor material having a wider band gap and a lower carrier density than silicon is preferable because off-state current of the transistor can be reduced.

For example, the oxide semiconductor preferably contains at least at least indium (In) or zinc (Zn), More preferably, the oxide semiconductor contains In-M-Zn-based oxide (M is a metal such as Al, Ti, Ga, Ge, Y, Zr, Sn, La, Ce, or Hf).

As the semiconductor layer, it is particularly preferable to use an oxide semiconductor film including a plurality of crystal parts whose c-axes are aligned perpendicular to a surface on which the semiconductor layer is formed or the top surface of the semiconductor layer and in which a grain boundary is not observed between adjacent crystal parts.

Such an oxide semiconductor does not have a grain boundary and thus is excellent in stability of electrical characteristics.

The use of such materials for the semiconductor layer makes it possible to provide a highly reliable transistor in which a change in the electrical characteristics is suppressed.

Furthermore, its low off-state current enables retention of charges accumulated in a capacitor that is series-connected to the transistor over a long period of time. The use of such a transistor enables fabrication of an electronic component in which power consumption is considerably reduced.

Note that one embodiment of the present invention is not limited thereto. The example where one embodiment of the present invention is applied to a wheel is described; however, one embodiment is not limited thereto, for example. Various embodiments of the invention are described in this embodiment and the other embodiments, and one embodiment of the present invention is not limited to a particular embodiment. For example, one embodiment of the present invention can be applied to a wheel, a thing equivalent to a wheel, or a thing other than a wheel.

This embodiment can be implemented in combination with any of the other embodiments described in this specification as appropriate.

Embodiment 3

The electric power control system described as an example in Embodiment 1 or the wheel described as an example in Embodiment 2 can be applied to an automobile using a tire. An automobile is an embodiment of a vehicle. As an automobile, a specialized vehicle such as a civil engineering work vehicle and a crane truck is included, in addition to a car, a truck, and a bus. In addition, the wheel 10 of one embodiment of the present invention can be installed in a one-wheeled, two-wheeled, or three-wheeled vehicle or a vehicle with five or more tires, in addition to a four-wheeled vehicle. As a two-wheeled vehicle, a structure with two wheels attached to a car body, one behind the other, like a motorcycle may be employed, or a structure with two tires provided on sides of a car body face-to-face may be employed. The system can also be applied to a bicycle, an electric bicycle, a power-assisted bicycle, a tire for an airplane, a tire for a helicopter, a tire for a vertical take-off and landing aircraft, an amphibious car, a tank, or the like.

Figure 23A:
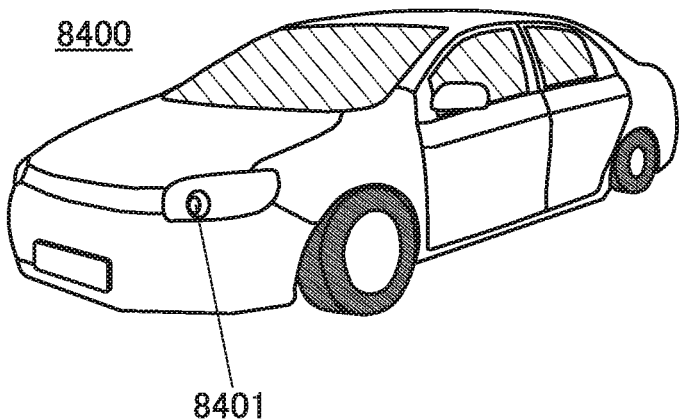
FIG. 23 Drawings each illustrating a vehicle of an embodiment.

FIG. 23 illustrates examples of a vehicle using one embodiment of the present invention. An automobile 8400 illustrated in FIG. 23(A) is an electric vehicle that uses an electric motor as a power source for driving. Alternatively, it is a hybrid vehicle capable of selecting and using either an electric motor or an engine as a power source for driving as appropriate. The use of one embodiment of the present invention allows fabrication of a high-mileage vehicle. Furthermore, the automobile 8400 includes a secondary battery. The secondary battery is capable of supplying electric power to a light-emitting device such as a headlight 8401 or a room light (not illustrated), in addition to driving the electric motor.

The secondary battery can also supply electric power to a display device included in the automobile 8400, such as a speedometer or a tachometer. Furthermore, the secondary battery can supply electric power to a semiconductor device included in the automobile 8400, such as a navigation system.

Figure 23B:
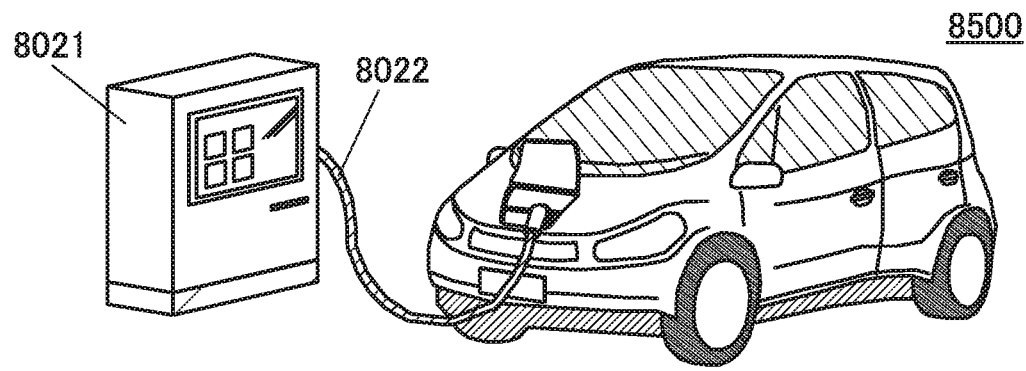

An automobile 8500 illustrated in FIG. 23(B) can be charged when the secondary battery (not shown) of the automobile 8500 is supplied with electric power from external charging equipment by a plug-in system, a contactless power feeding system, or the like. In FIG. 23(B), a state in which the secondary battery included in the automobile 8500 is charged from a ground-based charging apparatus 8021 through a cable 8022 is shown. In charging, a given method such as CHAdeMO (registered trademark) or Combined Charging System may be employed as a charging method, the standard of a connector, or the like as appropriate. The charging apparatus 8021 may be a charging station provided in a commerce facility or a household power source. For example, with the use of a plug-in technique, the secondary battery (not shown) included in the automobile 8500 can be charged by being supplied with electric power from the outside. The charge can be performed by converting alternating current electric power into direct current electric power through a converter such as an AC-DC converter.

Furthermore, although not shown, the vehicle may include a power receiving device so that it can be charged by being supplied with electric power from an above-ground power transmitting device in a contactless manner. In the case of the contactless power feeding system, by fitting a power transmitting device in a road or an exterior wall, charge can be performed not only when the vehicle is stopped but also when driven. In addition, the contactless power feeding system may be utilized to perform transmission and reception of electric power between vehicles. Furthermore, a solar cell may be provided in the exterior of the vehicle to charge the secondary battery when the vehicle stops or moves. To supply electric power in such a contactless manner, an electromagnetic induction method or a magnetic resonance method can be used.

Figure 23C:
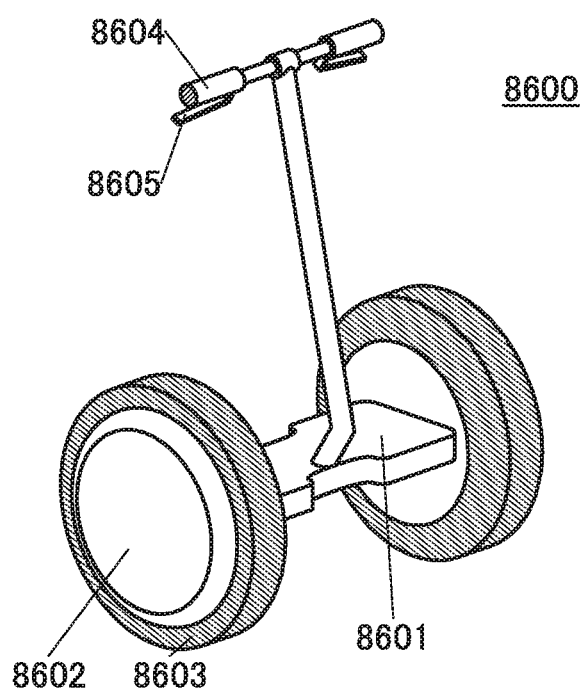

In FIG. 23(C), an electric two-wheeled vehicle 8600 is shown. The electric two-wheeled vehicle 8600 includes a car body 8601, a wheel 8602, a tire 8603, a handlebar 8604, an operation lever 8605, and the like.

A passenger can ride on the car body 8601 standing up. The electric two-wheeled vehicle 8600 includes a gyroscope sensor and a computer in the car body 8601, and the moving direction and speed can be controlled in accordance with a change in position of the center of gravity. For example, it can go forward when the passenger leans forward and the center of gravity moves forward, and stop or go backward when the passenger leans backward and the center of gravity moves backward. In addition, it can make a turn when the passenger moves the center of gravity rightward or leftward.

In the electric two-wheeled vehicle 8600, a motor, a battery, the other control device and the like are provided in the car body 8601 or the wheel 8602.

A light-emitting device is provided at the edge of the handlebar 8604 and functions as a winker that indicates the turning direction to other people around.

The operation lever 8605 is provided for performing a brake operation, for example. In addition, the operation lever 8605 can perform various operations such as power on/off operations, a winker operation, and a lock operation, in addition to a brake operation.

According to one embodiment of the present invention, an automobile provided with a battery in which more space-saving is achieved than in a conventional one can be fabricated. In addition, an automobile with improved design flexibility can be fabricated. An automobile capable of utilizing electric power at high efficiency can be fabricated.

Furthermore, the cycle characteristics of a secondary battery become better and the reliability can be improved. Furthermore, according to one embodiment of the present invention, characteristics of a secondary battery can be improved, and thus the secondary battery itself can be made compact and lightweight. The compact and lightweight secondary battery contributes to a reduction in the weight of a vehicle, and thus increases the mileage. Furthermore, the secondary battery included in the vehicle can be used as a source for supplying electric power to other products than the vehicle. In such a case, the use of a commercial power source can be avoided at peak time of electric power demand.

Embodiment 4

A structure example of a secondary battery that can be used for the battery 20 of one embodiment of the present invention and an example of a manufacturing method thereof will be described below with reference to drawings. An example of a bendable secondary battery will be described below.

Structure Example

Figure 24:
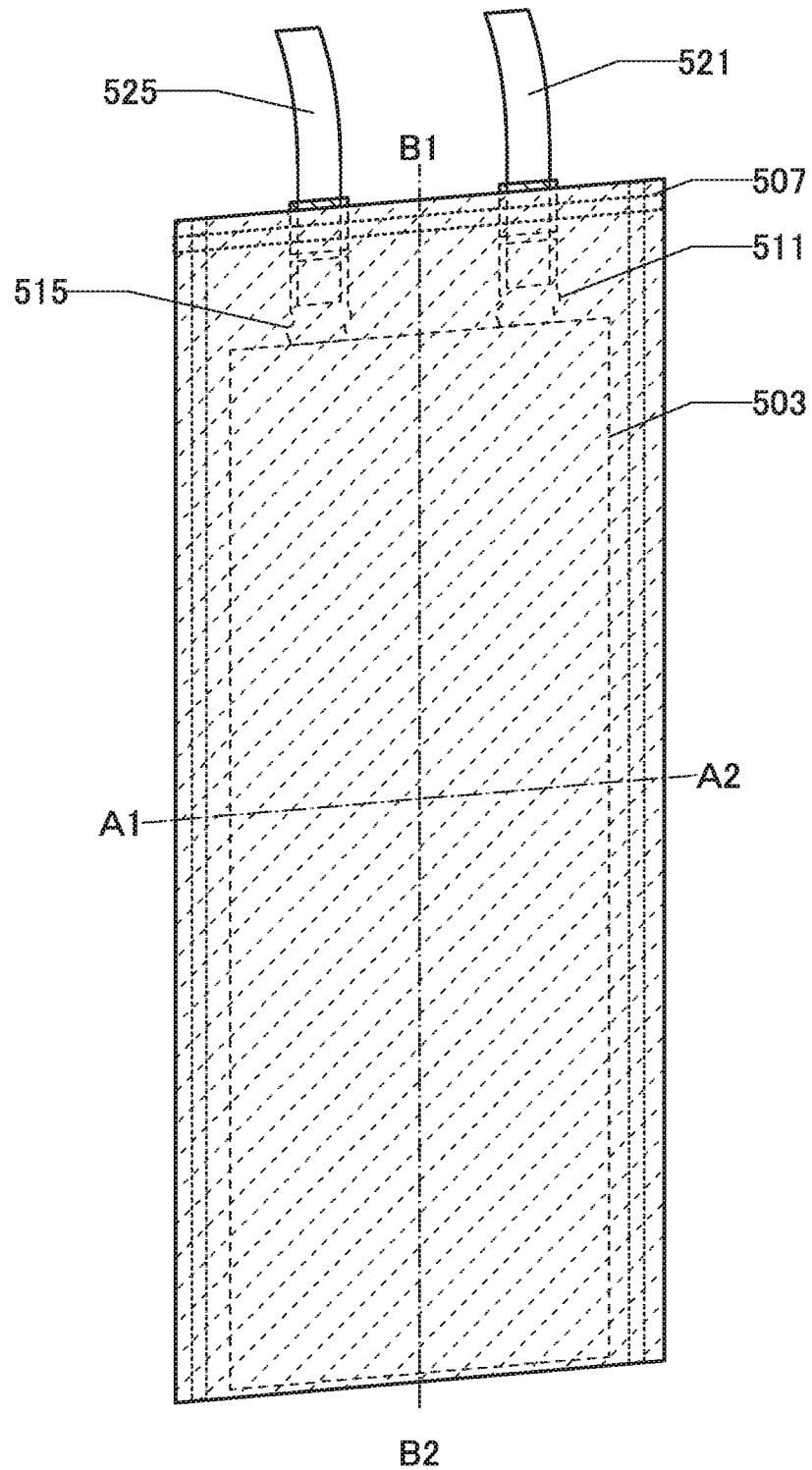
FIG. 24 A drawing illustrating a structure of a secondary battery of an embodiment.
Figure 25A:
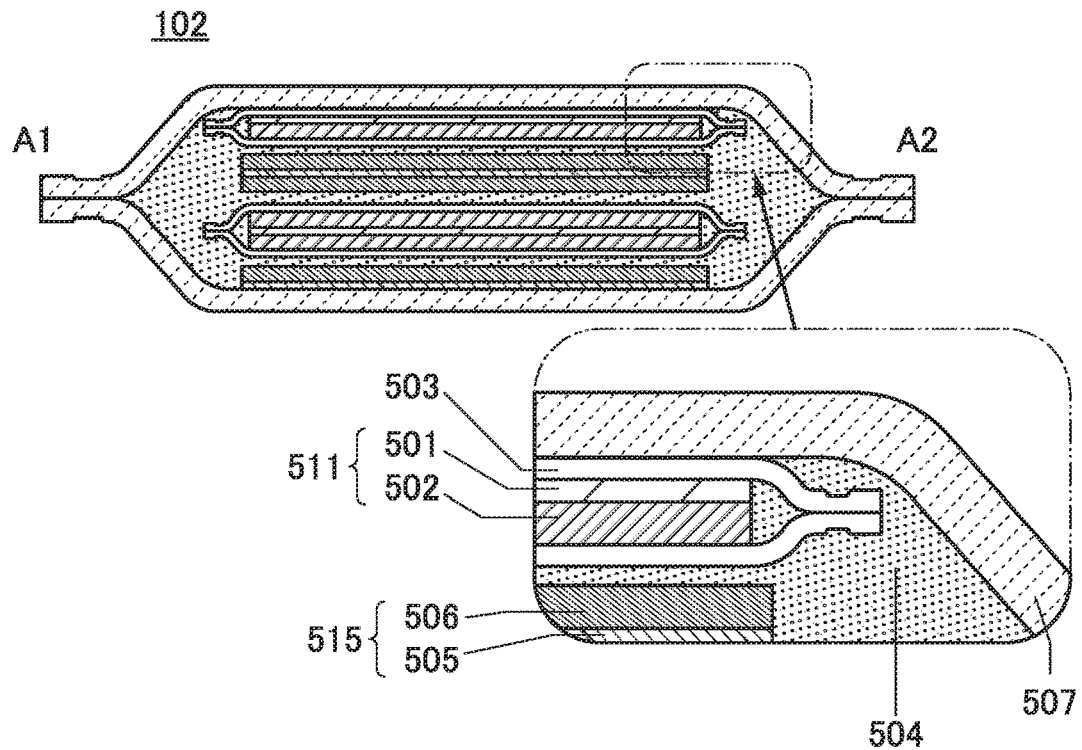
FIG. 25 Drawings each illustrating a structure of a secondary battery of an embodiment.
Figure 25B:
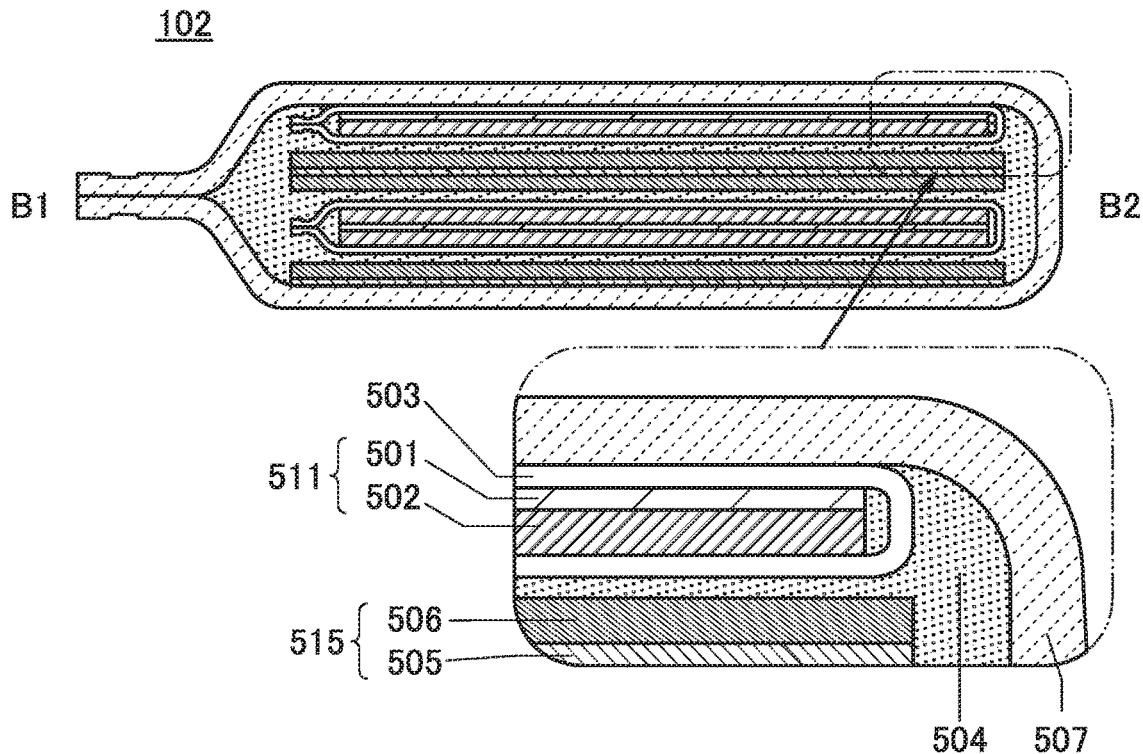

FIG. 24 is a perspective view showing an external appearance of a secondary battery 102. FIG. 25(A) is a cross-sectional view of a portion indicated by dashed-dotted line A1-A2 in FIG. 24. In addition, FIG. 25(B) is a cross-sectional view of a portion indicated by dashed-dotted line B1-B2 in FIG. 24.

The secondary battery 102 of one embodiment of the present invention includes, in an exterior body 507, a positive electrode 511 covered with a separator 503, a negative electrode 515, and an electrolyte solution 504. Note that in FIG. 24 and FIG. 25 is shown an example of the secondary battery that includes one positive electrode including a positive electrode active material layer 502 on one side of a positive electrode current collector 501, one positive electrode including a positive electrode active material layer 502 on each side of a positive electrode current collector 501, one negative electrode including a negative electrode active material layer 506 on one side of a negative electrode current collector 505, and one positive electrode including a negative electrode active material layer 506 on each side of a negative electrode current collector 505. The positive electrode 111 is electrically connected to a positive electrode lead 121, and the negative electrode 115 is electrically connected to a negative electrode lead 125. The positive electrode lead 121 and the negative electrode lead 125 are also referred to as lead electrodes or lead terminals. Parts of the positive electrode lead 121 and the negative electrode lead 125 are positioned outside the exterior body. Furthermore, the secondary battery 102 is charged and discharged through the positive electrode lead 121 and the negative electrode lead 125.

Note that, although in FIG. 25 the positive electrode 111 is covered with the separator 503, one embodiment of the present invention is not limited thereto. The positive electrode 111 need not necessarily covered with the separator 503, for example. The negative electrode 115, instead of the positive electrode 111, may be covered with the separator 503, for example.

[Positive Electrode]

The positive electrode 511 is made up of the positive electrode current collector 501, the positive electrode active material layer 502 formed over the positive electrode current collector 501, and the like. Although in FIG. 25 is shown the example including one positive electrode 511 including the positive electrode active material layer 502 on one side of the positive electrode current collector 501 with a sheet shape (or a band-like shape) and one positive electrode 511 including the positive electrode active material layer 502 on each side of the positive electrode current collector 501, one embodiment of the present invention is not limited thereto. Only the positive electrodes 511 each including the positive electrode active material layer 502 on one side of the positive electrode current collector 501 may be used. Only the positive electrodes 511 each including the positive electrode active material layer 502 on each side may also be used. The use of the positive electrodes 511 including the positive electrode active material layer 502 on each side allows increase in the capacity of the secondary battery 102. In addition, the secondary battery 102 including three or more positive electrodes 511 may be employed. An increase in the number of positive electrodes 511 in the secondary battery 102 allows an increase in the capacity of the secondary battery 102.

For the positive electrode current collector 501, a material that has high conductivity and does not dissolve at the potential of the positive electrode, such as a metal such as stainless steel, gold, platinum, aluminum, or titanium, or an alloy thereof can be used. An aluminum alloy to which an element that improves heat resistance, such as silicon, titanium, neodymium, scandium, or molybdenum, is added may also be used. Furthermore, it may be formed using a metal element that forms silicide by reacting with silicon. As the metal element that forms silicide by reacting with silicon, zirconium, titanium, hafnium, vanadium, niobium, tantalum, chromium, molybdenum, tungsten, cobalt, nickel, and the like are given. As the shape of the positive electrode current collector 501, a foil-like shape, a plate-like shape (a sheet-like shape), a net-like shape, a punching-metal shape, an expanded-metal shape, or the like can be used as appropriate. The positive electrode current collector 501 preferably has a thickness of greater than or equal to 5 μm and less than or equal to 30 μm. Furthermore, the surface of the positive electrode current collector 501 may be provided with an undercoat layer using graphite or the like.

The positive electrode active material layer 502 may include, in addition to a positive electrode active material, a binder for increasing adhesion of the positive electrode active material, a conductive additive for increasing the conductivity of the positive electrode active material layer 502, and the like.

As the positive electrode active material used for the positive electrode active material layer 502, a composite oxide having an olivine crystal structure, a layered rock-salt crystal structure, or a spinel crystal structure, and the like are given. As the positive electrode active material, a compound such as $LiFeO_2$, $LiCoO_2$, $LiNiO_2$, $LiMn_2O_4$, $V_2O_5$, $Cr_2O_5$, or $MnO_2$ is used, for example.

In particular, $LiCoO_2$ is preferable because it has advantages such as high capacity, higher stability in the air than $LiNiO_2$, and higher thermal stability than $LiNiO_2$.

Furthermore, it is preferable to add a small amount of lithium nickel oxide ($LiNiO_2$ or $LiNi_{1-x}M_xO_2$ ($0<x<1$) (M=Co, Al, or the like)) to a lithium-containing material having a spinel crystal structure which contains manganese such as $LiMn_2O_4$ because characteristics of the secondary battery using such a material can be improved.

A complex material (general formula $LiMPO_4$ (M is one or more of Fe(II), Mn(II), Co(II), and Ni(II))) can also be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b is less than or equal to 1, $0<a<1$, and $0<b<1$), $LiFe_cNi_dCo_ePO_4$, $LiFe_cNi_dMn_ePO_4$, $LiNi_cCo_dMn_ePO_4$ (c+d+e is less than or equal to 1, $0<c<1$, $0<d<1$, and $0<e<1$), and $LiFe_fNi_gCo_hMn_iPO_4$ (f+g+h+i is less than or equal to 1, $0<f<1$, $0<g<1$, $0<h<1$, and $0<i<1$).

In particular, $LiFePO_4$ is preferable because it meets requirements with balance for the positive electrode active material, such as safety, stability, high capacity density, and the existence of lithium ions that can be extracted in initial oxidation (charging).

A complex material such as general formula $Li_{(2-j)}MSiO_4$ (M is one or more of Fe(II), Mn(II), Co(II), and Ni(II), $0 \leq j \leq 2$) can also be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l is less than or equal to 1, $0<k<1$, $0<l<1$), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q is less than or equal to 1, $0<m<1$, $0<n<1$, $0<q<1$), and $Li_{(2-j)}Fe_rNi_sCo_tMn_uSiO_4$ (r+s+t+u is less than or equal to 1, $0<r<1$, $0<s<1$, $0<t<1$, $0<u<1$).

A nasicon compound expressed by general formula $A_xM_2(XO_4)_3$ (A=Li, Na, or Mg, M=Fe, Mn, Ti, V, or Nb, X=S, P, Mo, W, As, or Si) can also be used as the positive electrode active material. As the nasicon compound, $Fe_2(MnO_4)_3$, $Fe_2(SO_4)_3$, and $Li_3Fe_2(PO_4)_3$, and the like are given. As the positive electrode active material, a compound expressed by general formula $Li_2MPO_4F$, $Li_2MP_2O_7$, or $Li_5MO_4$ (M=Fe or Mn), a perovskite fluoride such as $NaFeF_3$ or $FeF_3$, a metal chalcogenide (a sulfide, a selenide, or a telluride) such as $TiS_2$ or $MoS_2$, an oxide with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like can also be used.

Note that, in the case where carrier ions are alkali metal ions other than lithium ions, or alkaline-earth metal ions, an alkali metal (e.g., sodium or potassium) or an alkaline-earth metal (e.g., calcium, strontium, barium, beryllium, or magnesium) instead of lithium may be used as the positive electrode active material. For example, a layered oxide containing sodium such as $NaFeO_2$ or $Na_{2/3}[Fe_{1/2}Mn_{1/2}]O_2$ may be used as the positive electrode active material.

Furthermore, a material in which two or more of the above materials are combined may be used as the positive electrode active material. For example, a solid solution in which two or more of the above materials are combined can be used as the positive electrode active material. For example, a solid solution of $LiCo_{1/3}Mn_{1/3}Ni_{1/3}O_2$ and $Li_2MnO_3$ can be used as the positive electrode active material.

Note that although not illustrated, a conductive material such as a carbon layer may be provided on a surface of the positive electrode active material layer 502. With the provision of the conductive material such as the carbon layer, conductivity of the electrode can be increased. For example, a carbon layer coating on the positive electrode active material layer 502 can be formed by mixing a carbohydrate such as glucose at the time of baking the positive electrode active material.

The average particle diameter of the primary particle of the granular positive electrode active material layer 502 to be used is preferably greater than or equal to 50 nm and less than or equal to 100 mm.

As the conductive additive, acetylene black (AB), graphite (black lead) particles, carbon nanotubes, graphene, fullerene, or the like can be used.

A network for electron conduction can be formed in the positive electrode 511 by the conductive additive. The conductive additive allows maintaining of a path for electric conduction between the positive electrode active material layers 502. The addition of the conductive additive to the positive electrode active material layer 502 leads to the positive electrode active material layer 502 having high electron conductivity.

As the binder, instead of polyvinylidene fluoride (PVDF) which is a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

The content of the binder with respect to the total amount of the positive electrode active material layer 502 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive with respect to the total amount of the positive electrode active material layer 502 is preferably greater than or equal to 1 wt % and less than or equal to 10 wt %, further preferably greater than or equal to 1 wt % and less than or equal to 5 wt %.

In the case where the positive electrode active material layer 502 is formed by a coating method, the positive electrode active material, the binder, and the conductive additive are mixed to form a positive electrode paste (slurry), which is applied onto the positive electrode current collector 501 and dried.

[Negative Electrode]

The negative electrode 515 is made up of the negative electrode current collector 505, the negative electrode active material layer 506 formed over the negative electrode current collector 505, and the like. Although in FIG. 25 is shown the example including one negative electrode 515 including the negative electrode active material layer 506 on one side of the negative electrode current collector 505 with a sheet shape (or a band-like shape) and one negative electrode 515 including the negative electrode active material layer 506 on each side of the negative electrode current collector 505, one embodiment of the present invention is not limited thereto. Only the negative electrodes 515 each including the negative electrode active material layer 506 on one side of the negative electrode current collector 505 may be used. In this case, the sides of the negative electrode current collectors 505, each of which is not provided with the negative electrode active material layer 506, are preferably placed to be in contact with each other, because the contacting sides with less friction can be made and stress generated when the secondary battery 102 is curved can be easily released. Only the negative electrodes 515 each including the negative electrode active material layer 506 on each side of the negative electrode current collector 505 may also be used. The use of the negative electrode 515 including the negative electrode active material layer 506 on each side allows increase in the capacity of the secondary battery 102. In addition, the secondary battery 102 including three or more negative electrodes 515 may be employed. An increase in the number of negative electrodes 515 in the secondary battery 102 allows an increase in the capacity of the secondary battery 102.

For the negative electrode current collector 505, a material that has high conductivity and is not alloyed with a carrier ion of lithium or the like, such as stainless steel, gold, platinum, iron, copper, titanium, or an alloy thereof can be used. An aluminum alloy to which an element that improves heat resistance, such as silicon, titanium, neodymium, scandium, or molybdenum, is added can also be used. As the shape of the negative electrode current collector 505, a foil-like shape, a plate-like shape (a sheet-like shape), a net-like shape, a punching-metal shape, an expanded-metal shape, or the like can be used as appropriate. The negative electrode current collector 505 preferably has a thickness greater than or equal to 5 μm and less than or equal to 30 μm. Furthermore, the surface of the negative electrode current collector 505 may be provided with an undercoat layer using graphite or the like.

The negative electrode active material layer 506 may include, in addition to a negative electrode active material, a binder for increasing adhesion of the negative electrode active material, a conductive additive for increasing the conductivity of the negative electrode active material layer 506, and the like.

There is no particular limitation on the negative electrode active material as long as it is a material with which lithium can be dissolved and precipitated or a material into/from which lithium ions can be inserted and extracted. Other than a lithium metal or lithium titanate, a carbon-based material generally used in the field of power storage, an alloy-based material, or the like can also be used as the material of the negative electrode active material layer 506.

A lithium metal is preferable because of its low oxidation-reduction potential (3.045 V lower than that of a standard hydrogen electrode) and high specific capacity per unit weight and per unit volume (3860 mAh/g and 2062 mAh/$cm^3$, respectively).

As a carbon-based material, graphite, graphitizing carbon (soft carbon), non-graphitizing carbon (hard carbon), a carbon nanotube, graphene, carbon black, and the like are given.

As graphite, artificial graphite such as meso-carbon microbeads (MCMB), coke-based artificial graphite, or pitch-based artificial graphite, natural graphite such as spherical natural graphite can be given.

Graphite has a low potential substantially equal to that of a lithium metal (0.1 V to 0.3 V vs. Li/Li$^+$) when lithium ions are inserted between layers (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

As the negative electrode active material, an alloy-based material or an oxide which enables charge-discharge reaction by an alloying reaction and a dealloying reaction with lithium can also be used. In the case where lithium ions are carrier ions, as an alloy-based material, a material containing at least one of Mg, Ca, Al, Si, Ge, Sn, Pb, Sb, Bi, Ag, Au, Zn, Cd, Hg, In, and the like, can be given, for example. Such elements have higher capacity than carbon; in particular, silicon has a significantly high theoretical capacity of 4200 mAh/g. For this reason, silicon is preferably used as the negative electrode active material. As the alloy-based material using such elements, $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like are given, for example.

As the negative electrode active material, an oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), or molybdenum oxide ($MoO_2$) can also be used.

As the negative electrode active material, $Li_{3-x}M_xN$ (M=Co, Ni, or Cu) with a $Li_3N$ type structure, which is a double nitride of lithium and a transition metal, can also be used. For example, $Li_{2.6}Co_{0.4}N_3$ is preferable because of high charge and discharge capacity (900 mAh/g and 1890 mAh/cm$^3$).

A double nitride of lithium and a transition metal is preferably used, in which case lithium ions are contained in the negative electrode active material and thus it can be used in combination with a material for a positive electrode active material which does not contain lithium ions, such as $V_2O_5$ or $Cr_3O_8$. Note that in the case of using a material containing lithium ions as a positive electrode active material, the double nitride of lithium and a transition metal can be used as the negative electrode active material by extracting the lithium ions contained in the positive electrode active material in advance.

A material which causes a conversion reaction can also be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. As the material that causes a conversion reaction, in addition, the reaction is caused by oxides such as $Fe_2O_3$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that the above fluorides can be used as positive electrode active materials since their potentials are high.

In the case where the negative electrode active material layer 506 is formed by a coating method, the negative electrode active material and the binder are mixed to form a negative electrode paste (slurry), which is applied onto the negative electrode current collector 505 and dried. Note that a conductive additive may be added to the negative electrode paste.

Graphene may be formed on a surface of the negative electrode active material layer 506. In the case where the negative electrode active material is silicon, the volume is greatly changed due to occlusion and release of carrier ions in charge-discharge cycles; therefore, adhesion between the negative electrode current collector 505 and the negative electrode active material layer 506 is decreased, resulting in degradation of battery characteristics caused by charge and discharge. Thus, graphene is preferably formed on a surface of the negative electrode active material layer 506 containing silicon because even when the volume of silicon is changed in charge-discharge cycles, decrease in the adhesion between the negative electrode current collector 505 and the negative electrode active material layer 506 can be inhibited, which reduces degradation of battery characteristics.

Furthermore, a coating film of an oxide or the like may be formed on the surface of the negative electrode active material layer 506. A coating film formed by decomposition or the like of an electrolyte solution in charging cannot release electric charges used at the formation, and therefore forms irreversible capacity. In contrast, the coating film of an oxide or the like provided on the surface of the negative electrode active material layer 506 in advance can reduce or prevent generation of irreversible capacity.

As the coating film coating the negative electrode active material layer 506, an oxide film of any one of niobium, titanium, vanadium, tantalum, tungsten, zirconium, molybdenum, hafnium, chromium, aluminum, or silicon or an oxide film containing any one of these elements and lithium can be used. Such a coating film is sufficiently dense, compared with a conventional coating film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Silicon oxide or aluminum oxide may also be used.

For the formation of a coating film that coats the negative electrode active material layer 506, a sol-gel method can be used, for example. A sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a sol-gel method is a method of forming a thin film from a liquid phase, raw materials can be mixed uniformly on the molecular level. For this reason, by adding a negative electrode active material such as graphite to a raw material of the metal oxide film which is a solvent, the active material can be easily dispersed into the gel. In such a manner, the coating film can be formed on the surface of the negative electrode active material layer 506. A decrease in the capacity of the power storage unit can be prevented by using the coating film.

[Separator]

As a material for forming the separator 503, a porous insulator such as cellulose, polypropylene (PP), polyethylene (PE), polybutene, nylon, polyester, polysulfone, polyacrylonitrile, polyvinylidene fluoride, tetrafluoroethylene, or polyphenylene sulfide can be used. Furthermore, nonwoven fabric of a glass fiber or the like, or a diaphragm in which a glass fiber and a polymer fiber are mixed may also be used.

[Electrolyte Solution]

As an electrolyte in the electrolyte solution 504, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, $Li(C_2F_5SO_2)_2N$, and $Li(SO_2F)_2N$. One of these electrolytes may be used alone, or two or more of them may be used in an appropriate combination and in an appropriate ratio.

As a solvent of the electrolyte solution 504, a material having carrier ion mobility is used. As the solvent of the electrolyte solution, an aprotic organic solvent is preferable. Typical examples of an aprotic organic solvent include ethylene carbonate (EC), propylene carbonate, dimethyl carbonate, diethyl carbonate (DEC), ethylmethyl carbonate (EMC), γ-butyrolactone, acetonitrile, dimethoxyethane, tetrahydrofuran, and the like, and one or more of these can be used. Furthermore, when a gelled high-molecular material is used as the solvent of the electrolytic solution or a high-molecular material for gelling is added to the electrolytic solution, for example, safety against liquid leakage and the like is improved. Furthermore, a thinner and lighter storage battery can be provided. Typical examples of a gelled high-molecular material include a silicone gel, an acrylic gel, an acrylonitrile gel, a polyethylene oxide-based gel, a polypropylene oxide-based gel, a gel of a fluorine-based polymer, and the like. Furthermore, the use of one or more kinds of ionic liquids (room temperature molten salts) which have features of non-flammability and non-volatility as the solvent of the electrolyte solution can prevent the storage battery from exploding or catching fire even when the storage battery internally shorts out or the internal temperature increases owing to overcharging or the like. Note that an ionic liquid is a salt in the fluid state and has high ion mobility (conductivity). In addition, an ionic liquid contains a cation and an anion. As an ionic liquid, an ionic liquid containing an ethylmethylimidazolium (EMI) cation, an ionic liquid containing an N-methyl-N-propylpiperidinium ($PP_{13}$) cation, or the like is given.

[Exterior Body]

There are a variety of structures of a secondary battery, and a film is used for formation of the exterior body 507 in this embodiment. Note that as the film for forming the exterior body 507, a single-layer film selected from a metal film (aluminum, stainless steel, nickel steel, or the like), a plastic film made of an organic material, a hybrid material film including an organic material (an organic resin, fiber, or the like) and an inorganic material (ceramic or the like), and a carbon-containing inorganic film (a carbon film, a graphite film, or the like); or a stacked-layer film including two or more of the above films is used. Forming depressions or projections on a metal film, to which embossing is easily performed, by embossing increases the surface area of the exterior body 507 exposed to outside air, achieving efficient heat dissipation.

Furthermore, in the case where the secondary battery 102 is changed in form by externally applying force, bending stress is externally applied to the exterior body 507 of the secondary battery 102, and this might partly deform or damage the exterior body 507. Projections or depressions formed on the exterior body 507 can relieve a strain caused by stress applied to the exterior body 507. Therefore, the reliability of the secondary battery 102 can be increased. Note that a "strain" is the scale of change in form indicating the displacement of a point of an object relative to the reference (initial) length of the object. Formation of depressions or projections on the exterior body 507 can reduce the influence of a strain caused by application of external force to the power storage unit to an acceptable range. Thus, the power storage unit having high reliability can be provided.

The above is the description of the structure example.

Fabrication Method Example

An example of a fabrication method of the secondary battery 102 will be described below.

(Preparing Positive Electrode and Covering it with Separator)

Figure 26A:
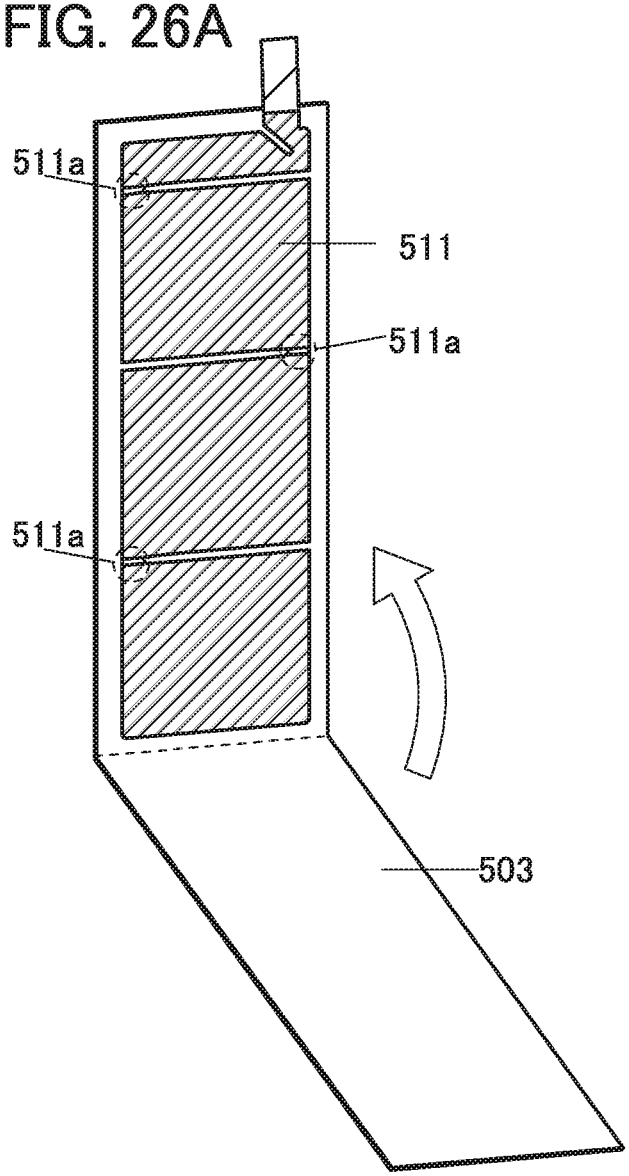
FIG. 26 Drawings illustrating a manufacturing method of a secondary battery of an embodiment.

First, the positive electrode 511 in which the positive electrode active material layer 502 is formed is placed on the separator 503 (see FIG. 26(A)). Note that FIG. 26(A) illustrates an example where the positive electrode active material layer 502 is provided on each side of the positive electrode current collector 501 having a meandering shape in which a slit is formed.

The slit formed in the positive electrode current collectors 501 can suppress the difference between the positions of end portions of the plurality of current collectors when the secondary battery 102 is curved. The slit can also relieve tension applied to the current collector far from the curvature center.

Furthermore, the positive electrode active material layer 502 is not provided in a region 511*a*, which overlaps with a slit of the negative electrode 515, when overlapping with the negative electrode 515 in a later step. If the positive electrode active material layer 502 is provided in the region 511*a* overlapping with the slit of the negative electrode 515, there is no negative electrode active material layer 506 in a region overlapping with the positive electrode active material layer 502, which might cause a problem in a battery reaction. Specifically, carrier ions released from the positive electrode active material layer 502 might concentrate in the negative electrode active material layer 506 closest to the slit, and the carrier ions might be deposited on the negative electrode active material layer 506. Thus, the deposition of the carrier ions on the negative electrode active material layer 506 can be suppressed when there is no positive electrode active material layer 502 provided in the region 511*a*, which overlaps with the slit of the negative electrode 515.

Then, the separator 503 is folded along the dotted line in FIG. 26(A) so that the positive electrode 511 is sandwiched by the separator 503. Next, the outer edges of the separator 503, which is outside of the positive electrode 511, are bonded to form the bag-like separator 503 (see FIG. 26(B)). The bonding of the outer edges of the separator 503 can be performed with the use of an adhesive or the like, by ultrasonic welding, or by thermal fusion bonding.

Figure 26B:
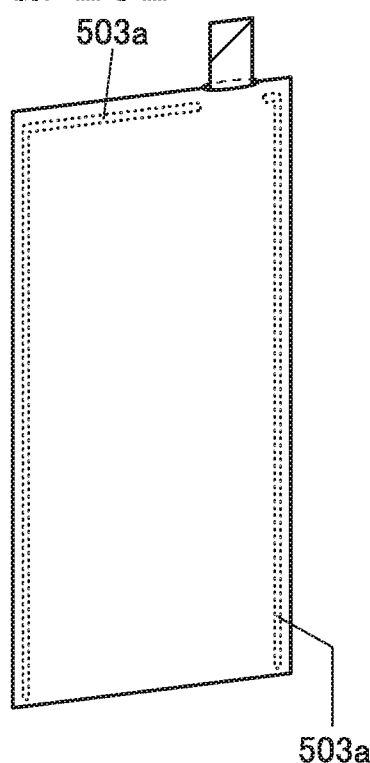

In this embodiment, polypropylene is used as the separator 503, and the outer edges of the separator 503 are bonded to each other by heating. Bonding portions 503*a* are illustrated in FIG. 26(B). In such a manner, the positive electrode 511 can be covered with the separator 503. The separator 503 is formed so as to cover the positive electrode active material layer 502 and need not necessarily cover the whole positive electrode 511.

Note that although the separator 503 is folded in FIG. 26, one embodiment of the present invention is not limited thereto. For example, the positive electrode 511 may be sandwiched between two separators. In that case, the bonding portion 503*a* may be formed to surround almost all of the four sides.

The outer edges of the separator 503 may be bonded intermittently or may be bonded at dot-like bonding portions provided at regular intervals.

Alternatively, bonding may be performed along only one side of the outer edges. Alternatively, bonding may be performed along only two sides of the outer edges. Alternatively, bonding may be performed on four sides of the outer edges. Accordingly, the four sides can be in an even state.

Although the case where the positive electrode 511 is covered with the separator 503 is shown in FIG. 26 and the like, one embodiment of the present invention is not limited thereto. The positive electrode 511 need not necessarily be covered with the separator 503, for example. The negative electrode 515, instead of the positive electrode 511, may be covered with the separator 503, for example.

(Preparing Negative Electrode)

Figure 26C:
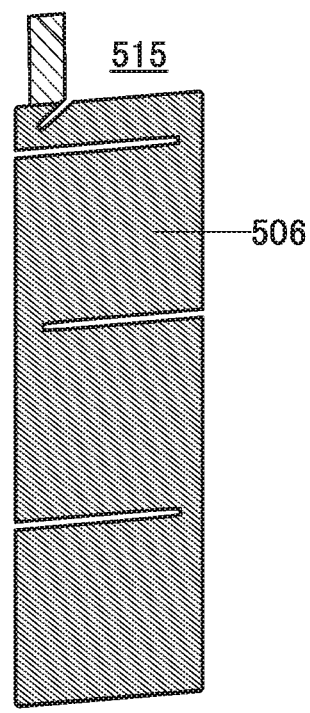

Next, the negative electrode 515 is prepared (see FIG. 26(C)). In FIG. 26(C), an example where the negative electrode active material layer 506 is provided on each side of the negative electrode current collector 505 having a meandering shape in which a slit is formed is shown.

The slit formed in the negative electrode current collectors 505 can suppress the difference between the positions of end portions of the plurality of current collectors when the secondary battery 102 is curved. The slit can also relieve tension applied to the current collector far from the curvature center.

(Making Positive Electrodes and Negative Electrodes Overlap with Each Other and Connecting Leads)

Figure 27A:
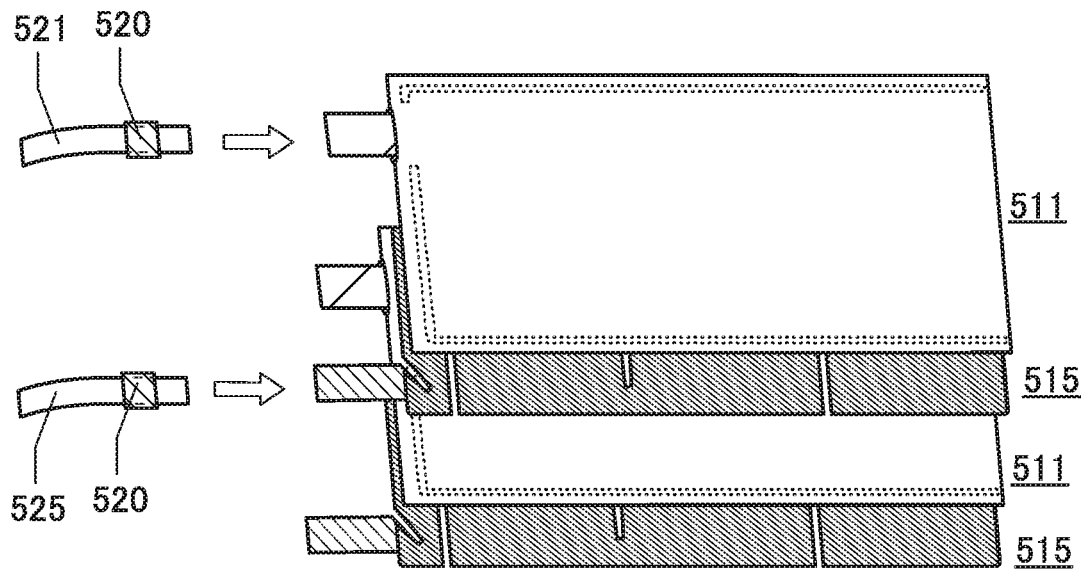
FIG. 27 Drawings illustrating a manufacturing method of a secondary battery of an embodiment.

Next, the positive electrodes 511 and the negative electrodes 515 are stacked (see FIG. 27(A)). In this embodiment, an example where two positive electrodes 511 and two negative electrodes 515 are used is shown.

Next, the positive electrode lead 521 including a sealing layer 520 is electrically connected to positive electrode tabs of the plurality of positive electrode current collectors 501 by ultrasonic wave irradiation with pressure applied (ultrasonic welding).

The lead electrode is likely to be cracked or cut by stress due to external force applied after fabrication of the power storage unit.

Figure 27B:
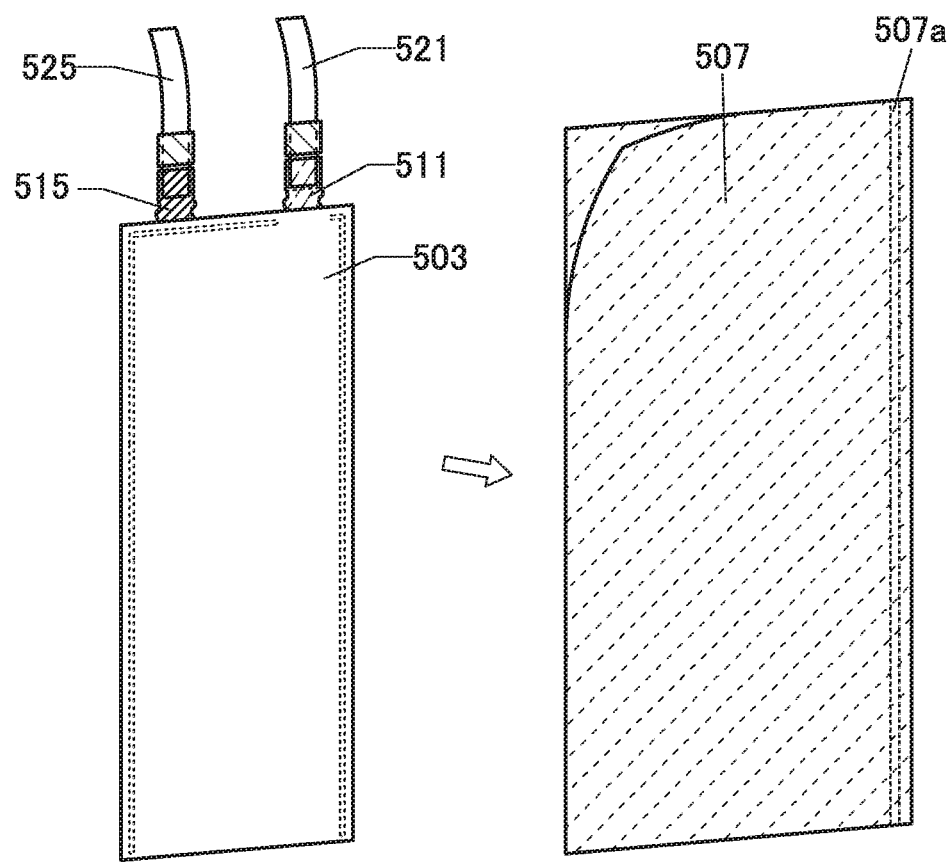

Thus, when subjected to ultrasonic welding, the positive electrode lead 521 are placed between bonding dies provided with projections, whereby a connection region and a curved portion can be formed in the positive electrode tab (FIG. 27(B)).

The provision of this curved portion can relieve stress due to external force applied after fabrication of the secondary battery 102. Therefore, the reliability of the secondary battery 102 can be improved.

Furthermore, without limiting to the formation of the curved portion in the positive electrode tab, forming the positive electrode current collector using a high-strength material such as stainless steel to a thickness of 10 µm or less so as to make a structure that easily relieves stress due to external force applied after fabrication of a secondary battery may be employed.

It is needless to say that two or more of the above examples may be combined to relieve concentration of stress in the positive electrode tab.

Then, in a manner similar to that of the positive electrode current collector 501, the negative electrode lead 525 including the sealing layer 520 is electrically connected to the negative electrode tab of the negative electrode current collector 505 by ultrasonic welding.

(Preparing Exterior Body and Covering Positive Electrodes and Negative Electrodes)

A film used as an exterior body is folded, and thermocompression bonding is performed along one side of the folded exterior body. A portion where thermocompression bonding is performed along one side of the folded exterior body 507 is indicated as a bonding portion 507a in FIG. 27(B). With this exterior body 507, the positive electrodes 511 and the negative electrodes 515 are covered.

(Injecting Electrolyte Solution)

Figure 28A:
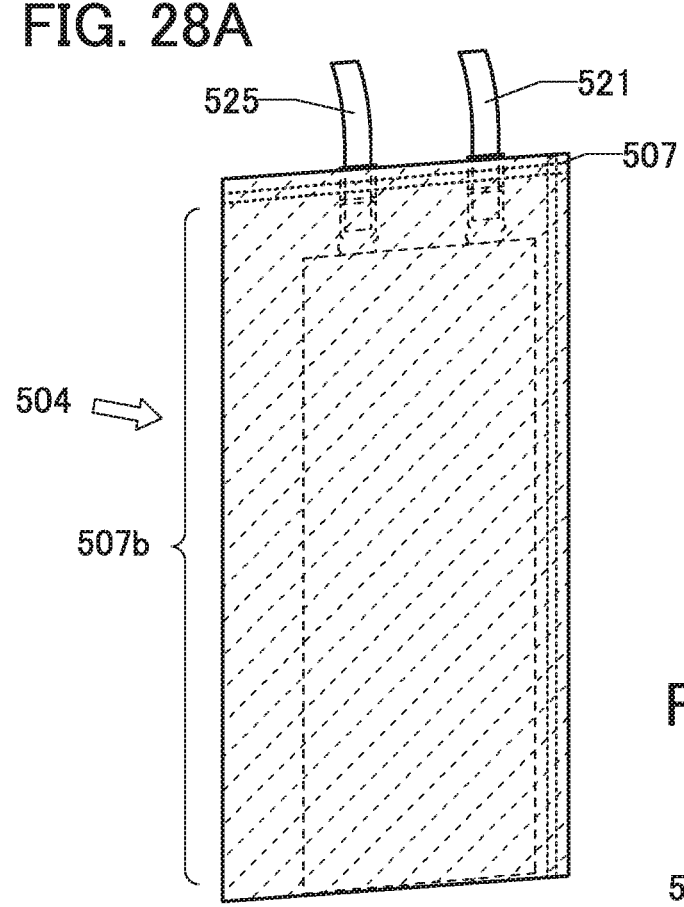
FIG. 28 Drawings illustrating a manufacturing method of a secondary battery of an embodiment.

Next, thermocompression bonding is also performed along one side of the exterior body 507, which overlaps with the sealing layer 520 of the positive electrode lead 521 and the sealing layer 520 including the negative electrode lead 525 (FIG. 28(A)). After that, the electrolyte solution 504 is injected from an unsealed side 507b of the exterior body 507, which is indicated in FIG. 28(A), into a region covered with the exterior body 507.

Figure 28B:
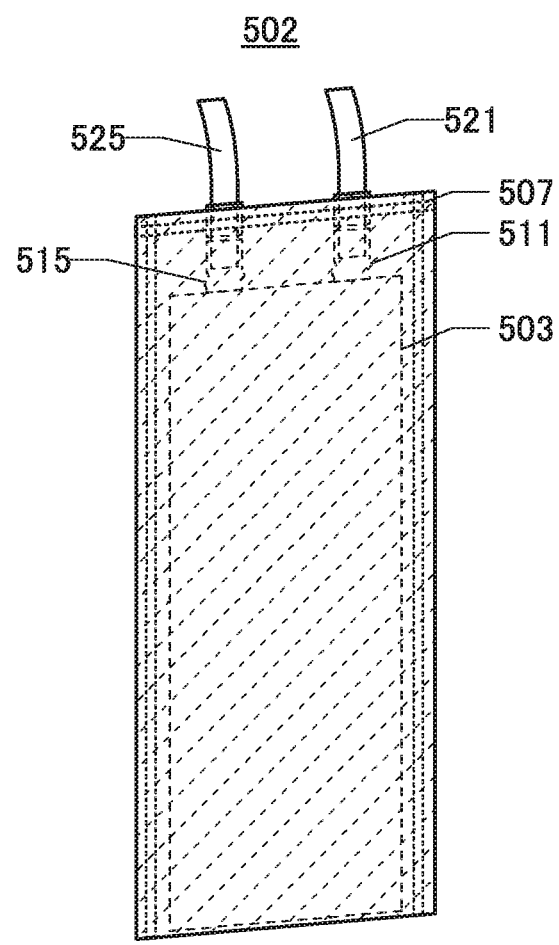

Then, the remaining open side of the exterior body 507 is sealed under vacuum, heating, and pressing, whereby the secondary battery 102 is obtained (FIG. 28(B)). Injecting the electrolyte solution and sealing are performed in an environment from which oxygen is eliminated, for example, with the use of a glove box. The evacuation may be performed with a vacuum sealer, a liquid pouring sealer, or the like. Heat and pressure application can be performed by setting the exterior body 110 between two heatable bars included in the sealer. An example of the conditions is as follows: the degree of vacuum is 60 kPa, the heating temperature is 190° C., the pressure is 0.1 MPa, and 3 seconds. Here, pressure may be applied to a unit through the exterior body 507. By the pressure application, bubbles which enter between the positive electrode and the negative electrode at the time of injection can be removed.

Modification Example

Figure 29A:
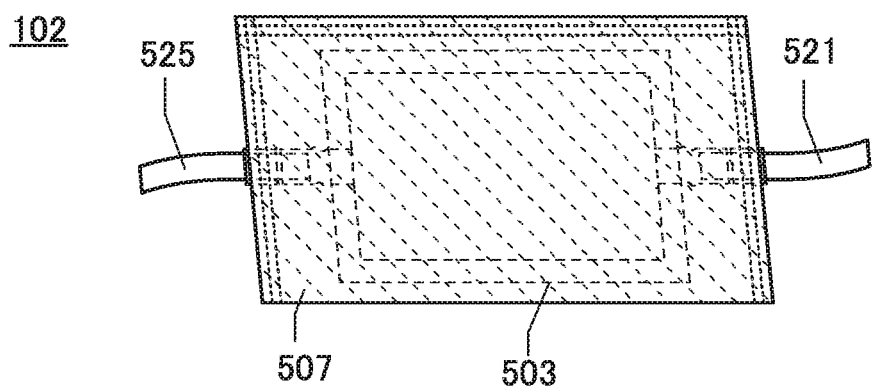
FIG. 29 Drawings illustrating a structure and a manufacturing method of a secondary battery of an embodiment.

As a modification example of the secondary battery 102, a secondary battery 102 is illustrated in FIG. 29(A). The secondary battery 102 illustrated in FIG. 29(A) is different from the secondary battery 102 in FIG. 24 in the arrangement of the positive electrode lead 521 and the negative electrode lead 525. Specifically, the positive electrode lead 521 and the negative electrode lead 525 in the secondary battery 102 in FIG. 24 are provided on the same side of the exterior body 507, whereas the positive electrode lead 521 and the negative electrode lead 525 in the secondary battery 102 in FIG. 29 are provided on different sides of the exterior body 507. In this way, the leads of the secondary battery of one embodiment of the present invention can be freely positioned, and accordingly the design flexibility is high. Thus, the design flexibility of a product using the secondary battery of one embodiment of the present invention can also be improved. Furthermore, the yield of products each including the secondary battery of one embodiment of the present invention can be increased.

Figure 29B:
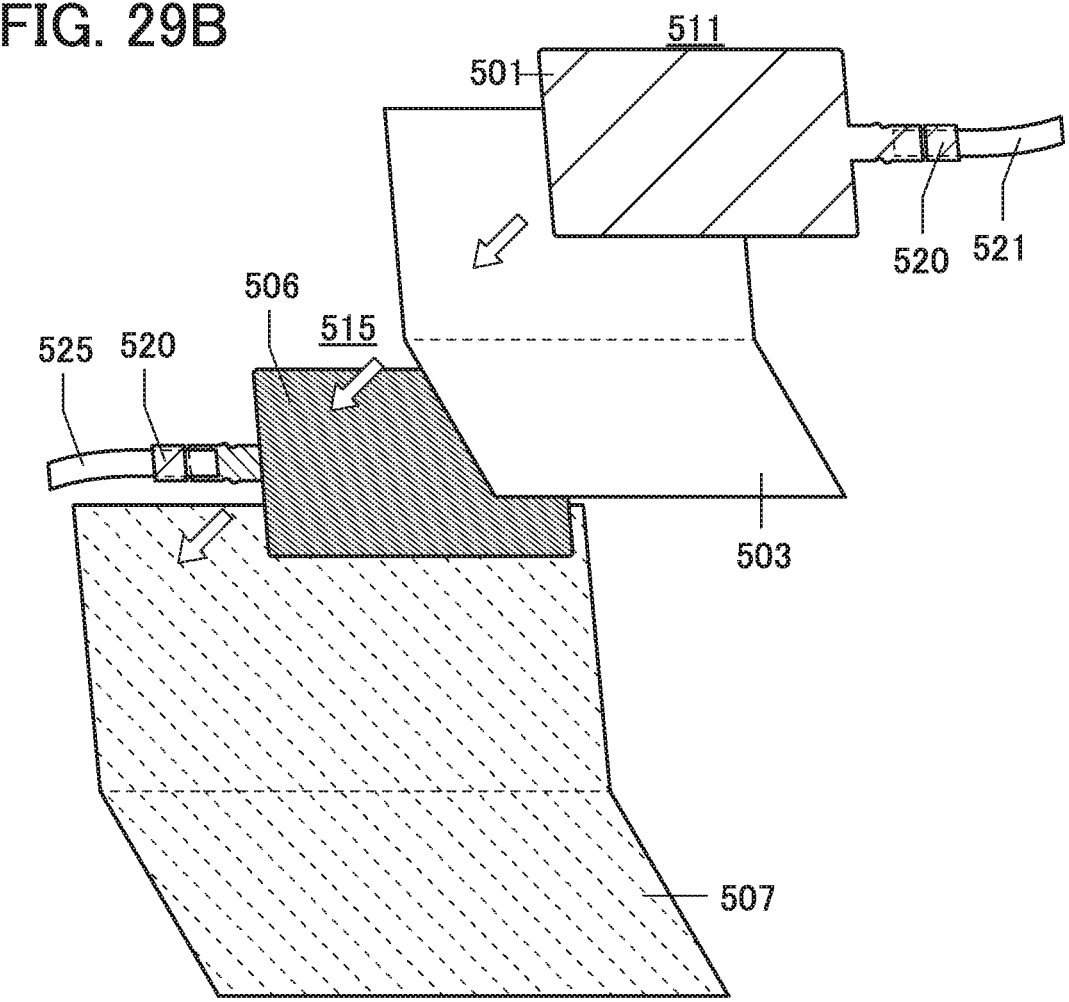

FIG. 29(B) illustrates a fabrication process of the secondary battery 102 in FIG. 29(A). The fabrication method of the secondary battery 102 in FIG. 24 can be referred to for the details. Note that in FIG. 29(B), the electrolyte solution 504 is not illustrated.

Pressing, e.g., embossing may be performed to form unevenness in advance on a surface of a film used as the exterior body 507. The unevenness on the surface of the film increases flexibility of a secondary battery and further relieves stress. The depressions or projections of a surface (or a rear surface) of the film formed by embossing form an obstructed space that is sealed by the film serving as a part of a wall of the sealing structure and whose inner volume is variable. It can be said that the depressions or projections of the film form an accordion structure or bellows structure in this obstructed space. Note that embossing, which is a kind of pressing, is not necessarily employed and any method that allows formation of a relief on part of the film is employed.

Note that one embodiment of the present invention is not limited thereto. Various embodiments of the invention are described in this embodiment and other embodiments, and one embodiment of the present invention is not limited to a particular embodiment. For example, although an example of application of one embodiment of the present invention to a lithium-ion secondary battery is described, one embodiment of the present invention is not limited thereto. One embodiment of the present invention can be applied to a variety of secondary batteries, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor or a lithium ion capacitor, and the like. One embodiment of the present invention is not necessarily applied to a lithium-ion secondary battery.

The above is the description of fabrication method example.

At least part of this embodiment can be implemented in combination with any of the other embodiments described in this specification as appropriate.

REFERENCE NUMERALS 10 wheel
10$a$ wheel
10$b$ wheel
10$c$ wheel
10$d$ wheel
11 rim portion
12 disk portion
13 bolt hole
15 portion
20 battery
20$a$ battery
20$b$ battery
20$c$ battery
20$d$ battery
21 connector
22 terminal
23 cable
25 circuit
26 antenna
27 window portion
30 electric power transmission mechanism
41 battery
42 battery
43 battery
45 terminal
50 car body
51 fixing portion
52 connector
53 antenna
54 cable
55 antenna support portion
60 electric power transmission mechanism
61 control unit
62 electric power control unit
62$a$ electric power control unit
62$b$ electric power control unit
62$c$ electric power control unit
62$d$ electric power control unit
63 engine
64 motor
64$a$ motor
64$b$ motor
64$c$ motor
64$d$ motor
65 battery
66 braking control portion
70 wheel
71 electric power control unit
72 electric power control unit
80 system
80$a$ system
80$b$ system
80$c$ system
80$d$ system
80$e$ system
80$f$ system
90 automobile
91 arrow
92 arrow
102 secondary battery
111 positive electrode
115 negative electrode
121 positive electrode lead
125 negative electrode lead
501 positive electrode current collector
502 positive electrode active material layer
503 separator
503$a$ bonding portion
504 electrolyte solution
505 negative electrode current collector
506 negative electrode active material layer
507 exterior body
507$a$ bonding portion
507$b$ side
511 positive electrode
511$a$ region
515 negative electrode
520 sealing layer
521 positive electrode lead
525 negative electrode lead
8021 charging apparatus
8022 cable
8400 automobile
8401 headlight
8500 automobile
8600 electric two-wheeled vehicle
8601 car body
8602 wheel
8603 tire
8604 handlebar
8605 operation lever

The invention claimed is:

1. A vehicle comprising:
a wheel comprising a rim portion, a disk portion, a first electric power transmission mechanism, and a battery;
an electric power control unit; and
a second electric power transmission mechanism electrically connected to the first electric power transmission mechanism,
wherein the battery includes an electrolyte solution which comprises an organic solvent,
wherein the battery is provided in the rim portion,
wherein the battery has a belt-like shape,
wherein the battery is provided in a state of being wrapped around a cylindrical portion of the rim portion more than one lap, wherein the first electric power transmission mechanism is provided in the disk portion, wherein the first electric power transmission mechanism is electrically connected to the battery, wherein the electric power control unit is configured to control charge and discharge of the battery using the second electric power transmission mechanism and the first electric power transmission mechanism, and wherein the second electric power transmission mechanism is electrically connected to the first electric power transmission mechanism in a state of the wheel rotating.

2. A vehicle comprising:

a wheel comprising a rim portion, a disk portion, a first electric power transmission mechanism, and a battery;

an electric power control unit; and a second electric power transmission mechanism electrically connected to the first electric power transmission mechanism, wherein the battery includes an electrolyte solution which comprises an organic solvent, wherein the battery is provided in the rim portion, wherein the battery has a belt-like shape, wherein the battery is provided in a state of being wrapped around a cylindrical portion of the rim portion more than one lap, wherein the first electric power transmission mechanism is provided in the disk portion, wherein the first electric power transmission mechanism is electrically connected to the battery, wherein the first electric power transmission mechanism is configured to wirelessly transmit and receive electric power, wherein the electric power control unit is configured to control charge and discharge of the battery using the second electric power transmission mechanism and the first electric power transmission mechanism, and wherein the second electric power transmission mechanism is configured to wirelessly transmit and receiving receive electric power.

3. A vehicle comprising:

a first unit comprising:
  a first wheel comprising a first rim portion and a first disk portion;
  a first motor configured to drive the first wheel;
  a first battery configured to receive regenerated electric power which is generated by the first motor; and
  a first electric power control unit to control the regenerated electric power generated by the first motor; and a second unit comprising:
  a second wheel comprising a second rim portion and a second disk portion;
  a second motor configured to drive the second wheel;
  a second battery configured to receive regenerated electric power which is generated by the second motor; and
  a second electric power control unit to control the regenerated electric power generated by the second motor, wherein the first battery includes an electrolyte solution which comprises an organic solvent, wherein the first battery is positioned in the first rim portion, wherein the second battery is positioned in the second rim portion, wherein the first battery has a first belt-like shape, wherein the first battery is provided in a state of being wrapped around a cylindrical portion of the first rim portion more than one lap, wherein the second battery includes an electrolyte solution which comprises an organic solvent, wherein the second battery has a second belt-like shape, and wherein the second battery is provided in a state of being wrapped around a cylindrical portion of the second rim portion more than one lap.

4. The vehicle according to claim 3, further comprising a control unit configured to control the first electric power control unit and the second electric power control unit.

5. The vehicle according to claim 3, wherein the first wheel and the second wheel are arranged in a direction orthogonal to a front direction of the vehicle.

6. The vehicle according to claim 3, wherein the second wheel is arranged to be behind the first wheel.

7. The vehicle according to claim 3, wherein each of the first wheel and the second wheel is configured to wirelessly transmit and receive electric power.

8. The vehicle according to claim 3, wherein the vehicle is electrical vehicle.

* * * * *